United States Patent
Wu et al.

(10) Patent No.: US 7,467,377 B2
(45) Date of Patent: *Dec. 16, 2008

(54) METHODS AND APPARATUS FOR COMPILER MANAGED FIRST CACHE BYPASSING

(75) Inventors: Youfeng Wu, Palo Alto, CA (US); Li-Ling Chen, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 953 days.

This patent is subject to a terminal disclaimer.

(21) Appl. No.: 10/278,682

(22) Filed: Oct. 22, 2002

(65) Prior Publication Data

US 2004/0078790 A1    Apr. 22, 2004

(51) Int. Cl.
    G06F 9/45    (2006.01)
    G06F 12/00   (2006.01)

(52) U.S. Cl. .................. 717/154; 717/141; 717/159; 711/3; 711/138

(58) Field of Classification Search ......... 717/131–161; 711/3, 138
    See application file for complete search history.

(56) References Cited

U.S. PATENT DOCUMENTS

| | | | | |
|---|---|---|---|---|
| 5,357,618 A | * | 10/1994 | Mirza et al. ............ | 711/3 |
| 5,499,354 A | * | 3/1996 | Aschoff et al. .......... | 711/129 |
| 5,586,296 A | * | 12/1996 | Bernstein et al. ........ | 711/138 |
| 5,625,793 A | * | 4/1997 | Mirza ................... | 711/138 |
| 5,751,946 A | * | 5/1998 | Afsar et al. ............ | 714/50 |
| 5,860,078 A | * | 1/1999 | Emmot ................... | 711/3 |
| 6,052,775 A | | 4/2000 | Panwar et al. | |
| 6,134,710 A | * | 10/2000 | Levine et al. ........... | 717/158 |
| 6,202,204 B1 | | 3/2001 | Wu et al. | |
| 6,226,722 B1 | * | 5/2001 | Shippy et al. ........... | 711/168 |
| 6,230,317 B1 | | 5/2001 | Wu | |
| 6,332,214 B1 | | 12/2001 | Wu | |
| 6,446,145 B1 | * | 9/2002 | Har et al. .............. | 710/68 |
| 6,516,462 B1 | * | 2/2003 | Okunev et al. .......... | 717/154 |
| 6,564,299 B1 | * | 5/2003 | Auracher ............... | 711/138 |
| 6,571,385 B1 | | 5/2003 | Muthukumar et al. | |
| 6,625,725 B1 | | 9/2003 | Wu et al. | |
| 6,629,314 B1 | | 9/2003 | Wu | |
| 6,668,372 B1 | | 12/2003 | Wu | |

(Continued)

OTHER PUBLICATIONS

Collins et al., Runtime identification of cache conflict misses: The adaptive miss buffer, ACM Press, vol. 19, Issue 4 Nov. 2001, pp. 413-439.*

(Continued)

*Primary Examiner*—Wei Y Zhen
*Assistant Examiner*—Satish S. Rampuria
(74) *Attorney, Agent, or Firm*—Hanley, Flight & Zimmerman LLC.

(57) ABSTRACT

Methods and apparatus to manage bypassing of a first cache are disclosed. In one such method, a load instruction having an expected latency greater than or equal to a predetermined threshold is identified. A request is then made to schedule the identified load instruction to have a predetermined latency. The software program is then scheduled. An actual latency associated with the load instruction in the scheduled software program is then compared to the predetermined latency. If the actual latency is greater than or equal to the predetermined latency, the load instruction is marked to bypass the first cache.

54 Claims, 12 Drawing Sheets

U.S. PATENT DOCUMENTS

| | | | |
|---|---|---|---|
| 6,684,299 B2 | 1/2004 | Hetherington et al. | |
| 6,698,015 B1 * | 2/2004 | Moberg et al. | 717/154 |
| 6,836,841 B1 | 12/2004 | Wu et al. | |
| 6,848,100 B1 | 1/2005 | Wu et al. | |
| 6,959,435 B2 | 10/2005 | Ju et al. | |
| 6,961,930 B1 * | 11/2005 | Waldspurger et al. | 717/141 |
| 6,964,043 B2 | 11/2005 | Wu et al. | |
| 7,039,909 B2 | 5/2006 | Wu et al. | |
| 2003/0145314 A1 | 7/2003 | Nguyen et al. | |
| 2005/0149915 A1 | 7/2005 | Wu | |
| 2005/0210197 A1 | 9/2005 | Rakvic et al. | |
| 2005/0240896 A1 | 10/2005 | Wu et al. | |

OTHER PUBLICATIONS

Bershad et al., Avoiding conflict misses dynamically in large direct-mapped caches, ACM Press, 1994, pp. 158-170.*

Hwu et al., Achieving high instruction cache performance with an optimizing compiler, ACM Press, 1989, pp. 242-251.*

Chen et al., Reducing memory latency via non-blocking and prefetching caches, ACM Press, 1992, pp. 51-61.*

Johnson et al., Run-Time Cache Bypassing, IEEE, Dec. 1999 (vol. 48, No. 12) pp. 1338-1354.*

Wu et al., Compiler managed micro-cache bypassing for high performance EPIC processors, IEEE, Nov. 18-22, 2002 pp. 134-145.*

Hybrid compiler/hardware prefetching for multiprocessors using low-overhead cache miss traps, Skeppstedt, J.; Dubois, M., IEEE, 1997, pp. 298-305.*

Run-time cache bypassing, Johnson, T.L.; Connors, D.A.; Merten, M.C.; Hwu, W.-M.W., IEEE, vol. 48 Issue: 12, 1999, pp. 1338-1354.*

"Intel Itanium 2 Processor." http://www.intel.com/products/server/processors/server/itanium2/. Printed on Aug. 9, 2002.

"Itanium." http://searchhp.techtarget.com/sDefinition/0,,sid6_gci214552,00.html. Printed on Aug. 9, 2002.

"EPIC." http://searchhp.techtarget.com/sDefinition/0,,sid6_gci214560,00.html. Printed on Aug. 9, 2002.

C.-H. Chi et al. "Improving Cache Performance By Selective Cache Bypass." Proceedings of the Twenty-Second Annual Hawaii International Conference On System Sciences, 1989. vol. I: Architecture Track, 1989. pp. 277-285. 1989.

J. Crawford. "Introducing The Itanium Processors." IEEE Micro,Sep./Oct. 2000 (vol. 20, No. 5). pp. 9-11. 2000.

J. Bharadwaj et al. "Wavefront Scheduling: Path based Data Representation and Scheduling of Subgraphs." MICRO 32, Proceedings of the 32nd Annual IEEE/ACM International Symposium on Microarchitecture. pp. 262-271. 2000.

B. Fields et al. "Slack: Maximizing Performance Under Technological Constraints." Proceedings of The 29th International Symposium on Computer Architecture (ISCA '02), 2002.

B. Fields et al. "Focusing Processor Policies via Critical-Path Prediction." The 28th International Symposium on Computer Architecture (ISCA '01), 2001.

B. Fisk et al. "The Non-Critical Buffer: Using Load Latency Tolerance to Improve Data Cache Efficiency." IEEE International Conference On Computer Design. Oct. 1999.

R. Johnson et al. "Dependence-Based Program Analysis." Dependence-Based Program Analysis. ACM SIGPLAN'93 Conference on Programming Language Design and Implementation. pp. 78-89. 1993.

T. L. Johnson et al. "Run-Time Cache Bypassing." IEEE Transactions on Computers, vol. 48, No. 12, Dec. 1999, pp. 1338-1354. 1999.

N. Kurd et al. "A Multigigahertz clocking scheme for the Pentium 4 microprocessor", JSSC, vol. 36, Nov. 2001, pp. 1647-1653. 2001.

A. Lebeck et al. "Cache Profiling and the SPEC Benchmarks: A Case Study." IEEE Computer 27(10). pp. 15-26. 1994.

H.-H. S. Lee et al. "Region-Based Caching: An Energy-Delay Efficient Memory Architecture For Embedded Processors." International Conference on Compilers, Architecture, and Synthesis for Embedded Systems 2000. pp. 120-127. 2000.

P. Livadas et al. "Program Dependence Analysis." Proceedings of International Conference On Software Maintenance. pp. 356-365. 1992.

S. Mahlke et al. "Sentinel Scheduling: A Model for Compiler-Controlled Speculative Execution." Transactions on Computer Systems, vol. 11, No. 4, Nov. 1993. pp. 376-408. 1993.

R. Rakvic et al. "Non-vital Loads." Proceedings of the Eighth International Symposium on High-Performance Computer Architecture. 2002.

J. Rives et al. "Reducing Conflicts In Direct-Mapped Caches With A Temporality-Based Design." Proceedings of the 1996 International Conference on Parallel Processing, vol. I. pp. 154-163. 1996.

M. Schlansker et al. "EPIC: Explicitly Parallel Instruction Computing." IEEE Computer, Feb. 2000. pp. 37-45. 2000.

H. Sharangpani et al. "Itanium Processor Microarchitecture." IEEE Micro, vol. 20 Issue: 5, Sep.-Oct. 2000. pp. 24-43. 2000.

S. Srinivasan et al. "Locality vs. Criticality." Proceedings of the 28th Annual International Symposium on Computer Architecture, ISCA 2001.

A. Stoutchinin et al. "Speculative Prefetching of Induction Pointers." Compiler Construction, 10th International Conference. 2001.

E. Tam et al. "Active Management Of Data Caches By Exploiting Reuse Information." IEEE Transactions on Computers 48(11). pp. 1244-1259. 1999.

J. Lo et al. *Improving Balanced Scheduling With Compiler Optimizations That Increase Instruction-Level Parallelism*. Proceedings of the ACM SIGPLAN'95 Conference on Programming Language Design and Implementation (PLDI), pp. 151-162 (Jun. 1995).

Choi Y., Knies A., Vedaraman G., Williamson J., *Design and Experience: Using the Intel Itanium 2 Processor Performance Monitoring Unit to Implement Feedback Optimizations*, 2nd Workshop on EPIC Architectures and Compiler Technology, pp. 1-11, XP002326247, pp. 1-3 (Nov. 18, 2002).

Chilimbi, T.M., *Efficient Representations and Abstractions for Quantifying and Exploiting Data Reference Locality*, ACM SIGPlan 2001 Conference on Programming Language Design and Implementation, pp. 1-12, XP002326248, pp. 4-5; Fig. 4 (Jun. 2001).

Inagaki, T., Onodera, T., Komatsu, H., Nakatani, T., *Stride Prefetching by Dynamically Inspecting Objects*, Proceedings of the ACM SIGPlan 2003 Conference on Programming Language Design and Implementation, pp. 269-277, XP002326249, p. 274 (Jun. 9, 2003).

Chilimbi, T.M., et al., *Using Generational Garbage Collection to Implement Cache-Conscious Data Placement*, ACM SIGPlan Notices, Association for Computing Machinery, New York, US, vol. 34, No. 3, pp. 37-48, XP000993595, ISSN: 0362-1340, pp. 37-48 (Mar. 1999).

Tabatabai, A., et al., *Prefetch Injection Based on Hardware Monitoring and Object Metadata*, Proceedings of the ACM SIGPlan 2004 Conference on Programming Language Design and Implementation, pp. 267-276, XP002326250, pp. 267-276 (Jun. 9, 2004).

U.S. Appl. No. 10/028,885, filed Dec. 21, 2001, Wu et al.

U.S. Appl. No. 10/136,755, filed Apr. 30, 2002, Wu.

U.S. Appl. No. 09/522,510, filed Mar. 10, 2000, Wu.

U.S. Appl. No. 10/410,032, filed Apr. 8, 2003, Wu.

Intel Corporation Press Release, *Intel Delivers Hyper-Threading Technology with Pentium® 4 Processor 3 Ghz Milestone*, http://www.intel.com/pressroom/archive/releases/20021114comp.htm, downloaded Nov. 14, 2002.

Tian et al., *Intel® OpenMP C++/Fortran Compiler for Hyper-Threading Technology: Implementation and Performance*, Intel Technology Journal Q1, 2002. vol. 6, Issue 1., pp. 1-11.

Wang et al., *Speculative Precomputation: Exploring the Use of Multithreading for Latency*, Intel Technology Journal Q1, 2002. vol. 6 Issue 1., pp. 1-14.

Collins et al., *Speculative Precomputation: Long-range Prefetching of Delinquent Loads*, Proceedings of the 28th International Symposium on Computer Architecture, Jul. 2001.

Carlisle, Martin Christopher, *Olden: Parallelizing Programs with Dynamic Data Structures on Distributed-Memory Machines*, Jun. 1996.

Kim et al., *Design and Evaluation of Compiler Algorithms for Pre-Execution*, ACM SIGARCH Computer Architecture News, vol. 30, Issue 5, Dec. 2002, pp. 159-170.

Annavaram et al., *Data Prefetching by Dependence Graph Precomputation*, 28th Annual International Symposium on Computer Architecture (ISCA'01), 2001.

Liao et al., *Post-Pass Binary Adaptation for Software-Based Speculative Precomputation*, Proceedings of the ACM SIGPLAN 2002 Conference on Programming language design and implementation, pp. 117-128.

Chappell et al., *Simultaneous Subordinate Microthreading (SSMT)*, Proceedings of the 26th annual international symposium on Computer architecture, 1999, pp. 1-10.

*International Search Report*, International Bureau, Oct. 10, 2004, 3 pages.

Johnson et al., "*Run-Time Adaptive Cahse Hierarchy Via Reference Analysis*", Coference Proceedigns Article, Jun. 2, 1997, pp. 315-326.

Johnson et al., "*Run-Time Cache Bypassing*", IEEE Transactions on Computers, IEEE Inc., New York, vol. 48, No. 12, Dec. 1999, pp. 1338-1354.

Ortega et al., "*Cost-Effective Compiler Directed Memory Prefetching and Bypassing*", Conference Proceedings Article, Sep. 22, 2002, pp. 189-198.

Zalamea et al., "*Two-Level Hierarchical Register File Organization for VLIW Processors*", Micro-33, Proceedings of the 33$^{rd}$. Annual ACM/IEEE International Symposium on Microarchitecture, Monterey, California, Dec. 10-13, 2000, pp. 137-146.

Rotenberg et al., Trace Cache: a Low Latency Approach to High Bandwidth Instruction Fetching, copyright 1996, Proceedings of the 20th Annual International Symposium on Microarchitecture, Dec. 1996, pp. 1-12.

Chi et al., Improving Cache Performance by Selective Cache Bypass, System Sciences, 1989, vol. I: Architecture Track, Proceedings of the Twenty-Second Annual Hawaii International Conference on . . . Mar. 3-6, 1989, pp. 277-285.

German Office Action dated Jan. 18, 2008 for corresponding European Patent Application No. 103 93 481.2-53 (5 pages).

English Translation of German Office Action dated Jan. 18, 2008 for corresponding European Patent Application No. 103 93 481.2-53 (3 pages).

Abraham, Santosh G. et al., "Predictability of Load-Store Instruction Latencies," in Proceedings of the 26th Annual International Symposium on Microarchitecture, Dec. 1, 1993, pp. 139-152.

Notice of Allowance with Reasons to Allow corresponding U.S. Appl. No. 10/739,500 mailed Jun. 25, 2008 (27 pages).

\* cited by examiner

METHODS AND APPARATUS FOR COMPILER MANAGED FIRST CACHE BYPASSING

FIELD OF THE DISCLOSURE

This disclosure relates generally to computers and, more particularly, to methods and apparatus to manage μcache bypassing.

BACKGROUND

The typical computer has a random access memory hierarchy including one or more levels of on-processor cache memory, a main memory (located off of the processor chip) and a mass storage device (e.g., a hard disk drive, etc.). Typically, accessing the first level of cache memory (L1 cache) is fastest (i.e., has the lowest latency) and accessing the mass storage device is slowest. The latencies associated with accessing intermediate levels of the memory hierarchy fall between these two extremes of memory access latencies. In addition to increasing in latency time, the various levels of the memory hierarchy typically increase in size from the highest level of the memory hierarchy to the lowest level of the memory hierarchy.

Modern high performance processors (for example, the Intel Itanium™ family of processors and other EPIC (Explicitly Parallel Instruction Computing) processors have multiple levels of on-chip cache memory. For example, the Itanium® processor includes three levels of on-chip cache. Because the operating frequency of future processors is extremely high, in order to support a one cycle load from the memory system to a register of a high speed processor, the first level of the cache (i.e., the L1 cache referred to herein as "μcache") is typically small in storage size. For example, a μcache typically has the capacity to store 1K (kilobyte) or less of data.

Proper management of the small and fast μcache is important to the overall performance of the host processor it serves. In particular, in many instances a significant number of load instructions need to immediately retrieve data from the memory system to advance program execution without suffering a pipeline stall. Such instructions benefit if the data they require is stored in the μcache.

In the typical case, cache memory has an inclusive nature. Thus, when data is retrieved from a given level of the memory system (e.g., the μcache), it is written into all lower levels of the cache (e.g., the level 2 (L2) cache, the level 3 (L3) cache, etc). This practice maximizes the likelihood that data needed for a later instruction is present in the highest levels of the cache, thereby reducing the number of accesses to slower memory resources and the number of cache misses (i.e., a failed attempt to retrieve data from a cache level that does not contain the desired data).

DETAILED DESCRIPTION

Figure 1:
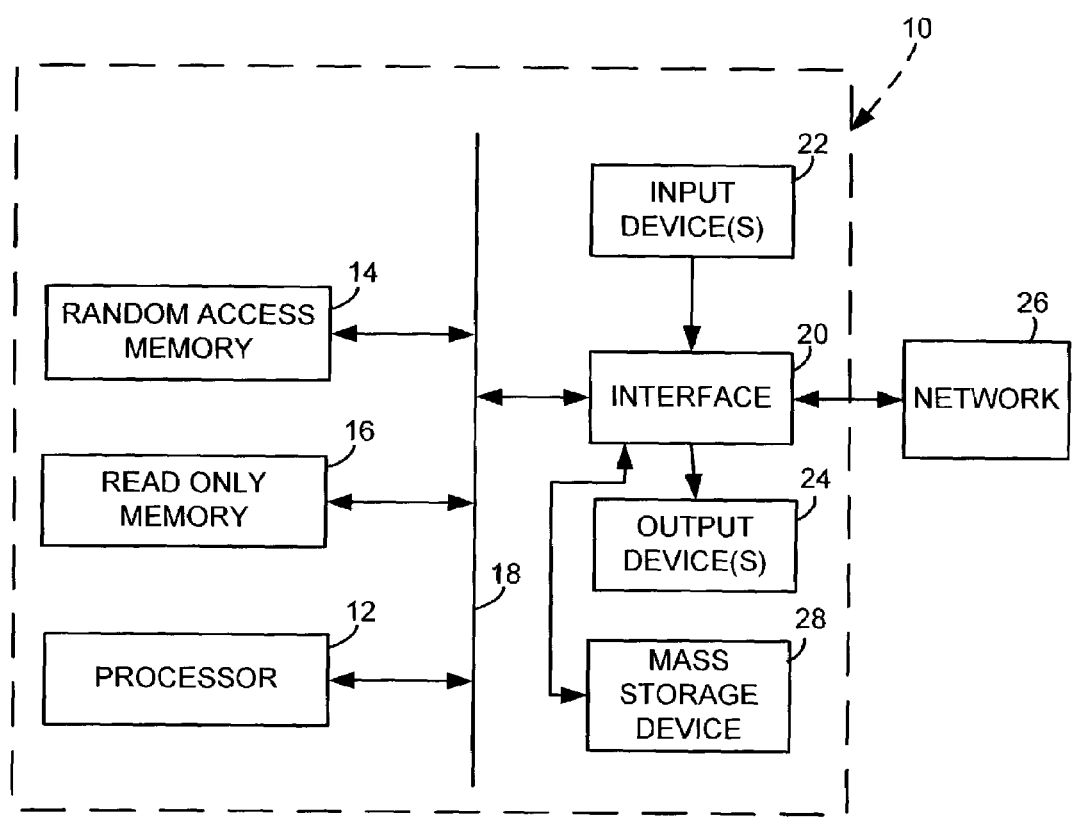
FIG. 1 is a schematic illustration of an example computer.

FIG. 1 is a block diagram of an example computer 10 capable of implementing the apparatus and methods disclosed herein. The computer 10 can be a personal digital assistant (PDA), a laptop computer, a notebook computer, a desktop computer, a server, an Internet appliance, or any other type of computing device.

The computer 10 of the instant example includes a processor 12 which is implemented, for example, by one or more Intel® microprocessors. In the illustrated example, the processor 12 is a statically scheduled in-order processor such as a processor from Intel's Itanium® processor family. The architectures of the processors in the Intel Itanium® family are preferred because they support a flag in the load instruction format. If the flag is not set, the load instruction will access the μcache. Otherwise, the load instruction will bypass the μcache and directly access the L2 cache.

As is conventional, the processor 12 is in communication with a main memory including a volatile memory 14 and a non-volatile memory 16 via a bus 18. The volatile memory 14 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 16 may be implemented by flash memory or any other desired type of memory device. Access to the main memory 14, 16 is typically controlled by a memory controller (not shown) in a conventional manner.

The example computer 10 also includes a conventional interface circuit 20. The interface circuit 20 may be implemented by any type of well known interface standard, such as an Ethernet interface, and/or a universal serial bus (USB) and/or a third generation input/output (3GIO) interface (also referred to as PCI Express).

One or more input devices 22 are connected to the interface circuit 20. The input device(s) 22 permit a user to enter data and commands into the processor 12. The input device(s) can be implemented by, for example, a keyboard, a mouse, a touchscreen, a track-pad, a trackball, isopoint and/or a voice recognition system.

One or more output devices 24 are also connected to the interface circuit 20. The output devices 24 can be implemented, for example, by display devices (e.g., a liquid crystal display, a cathode ray tube display (CRT), etc.), a printer and/or speakers). The interface circuit 20, thus, typically includes a graphics driver card.

The interface circuit 20 also includes a communication device such as a modem or network interface card to facilitate exchange of data with external computers via a network 26

(e.g., an Ethernet connection, a digital subscriber line (DSL), a telephone line, coaxial cable, a cellular telephone system, etc.).

The computer 10 also includes one or more mass storage devices 28 for storing software and data. Examples of such mass storage devices 28 include floppy disk drives, hard drive disks, compact disk drives and digital versatile disk (DVD) drives.

As is known, the memory system of the example computer 10 is arranged in a hierarchical fashion. For example, the processor(s) 12 include three levels of on-board cache memory. The first level of cache is the highest level of memory having the lowest access time. The first level of on-board cache memory is also the smallest cache and is referred to herein as μcache. The additional levels of cache progressively increase in size and access time. In this example, the processor 12 includes second and third levels of on-chip cache (i.e., L2 and L3 cache). The computer 10 also includes a fourth level (L4) cache which may be located on the same chip as the processor 12, or may have its own chip. The L4 cache is larger and slower to access than the μcache, the L2 cache, and the L3 cache. For example, the L4 cache can be implemented by SRAM. A fifth level of cache (main memory) is larger than and has slower access times than the L4 cache. For example, the main memory can be implemented by DRAM. In the example of FIG. 1, the L4 cache and the main memory are represented by the random access memory 14.

To execute program instructions, the processor 12 typically causes any needed data to load into the cache from a mass storage device. When data is loaded into a given level of the cache, it is typically written to all lower levels of cache to increase the likelihood that some level of cache will hold the data should it be needed again in the future. This redundancy or inclusion feature typically reduces the number of accesses to the mass storage device 28, which typically has the slowest access time of any portion of the memory.

When a processor 12 needs to execute an instruction, any data needed by the instruction is loaded from the cache (if present) or mass storage device 28 (if not present in the cache) to one or more registers in the processor 12 where it is then acted upon as dictated by the instruction.

Throughout this patent, the latency of the μcache is referred to as T1, the latency of the L2 cache is referred to as T2, the latency of the L3 cache is referred to as T3, etc. Example hit latencies (i.e., when the requested data is in the corresponding cache) are T1=1 cycle, T2=3 cycles, and T3=10 cycles. Throughout this patent a load instruction refers to an integer load instruction. Store operations and floating point loads directly access the L2 cache (i.e., always bypass the μcache) because store operations are typically not time critical and floating point loads always involve latencies greater than T1. Due to its small size, μcache should only store data that cannot be timely supplied by the lower level caches (e.g., L2 cache-main memory). In other words, if the data accessed by a given load instruction will not be used in the next T2 cycles, it should be directly accessed from the L2 cache. This rule of thumb reduces the pressure on the μcache so that more time critical data can be stored therein.

In addition, even if a loaded result is immediately used by a use instruction, if the corresponding initial load instruction misses the μcache (i.e., the loaded data is not in the μcache), and no later load instructions will access the loaded cache line, the initial load instruction should bypass the μcache and directly access the L2 cache. Directly accessing the L2 cache ensures the retrieved data is not written to the μcache. The bypass of the μcache is appropriate because the initial load instruction must access the L2 cache to reach the data (i.e., the data is not initially present in the μcache) and there are no pre-fetching effects associated with retrieving the data to the μcache so one would not want to burden the μcache with this data. Loads having these characteristics are referred to herein as miss-bypass (MB) loads.

Further, strided load instructions having certain characteristics should also bypass the μcache. A strided load instruction is a load instruction located within a loop having a dominant stride. The stride for the load instruction is the difference between two successive data addresses issued by the strided load instruction. If the trip count through the loop and/or the dominant stride size are sufficiently large relative to the size of the μcache, the strided load instruction will thrash the μcache if it does not bypass the μcache. Accordingly, these strided load instructions should be marked to bypass the μcache.

Figure 2:
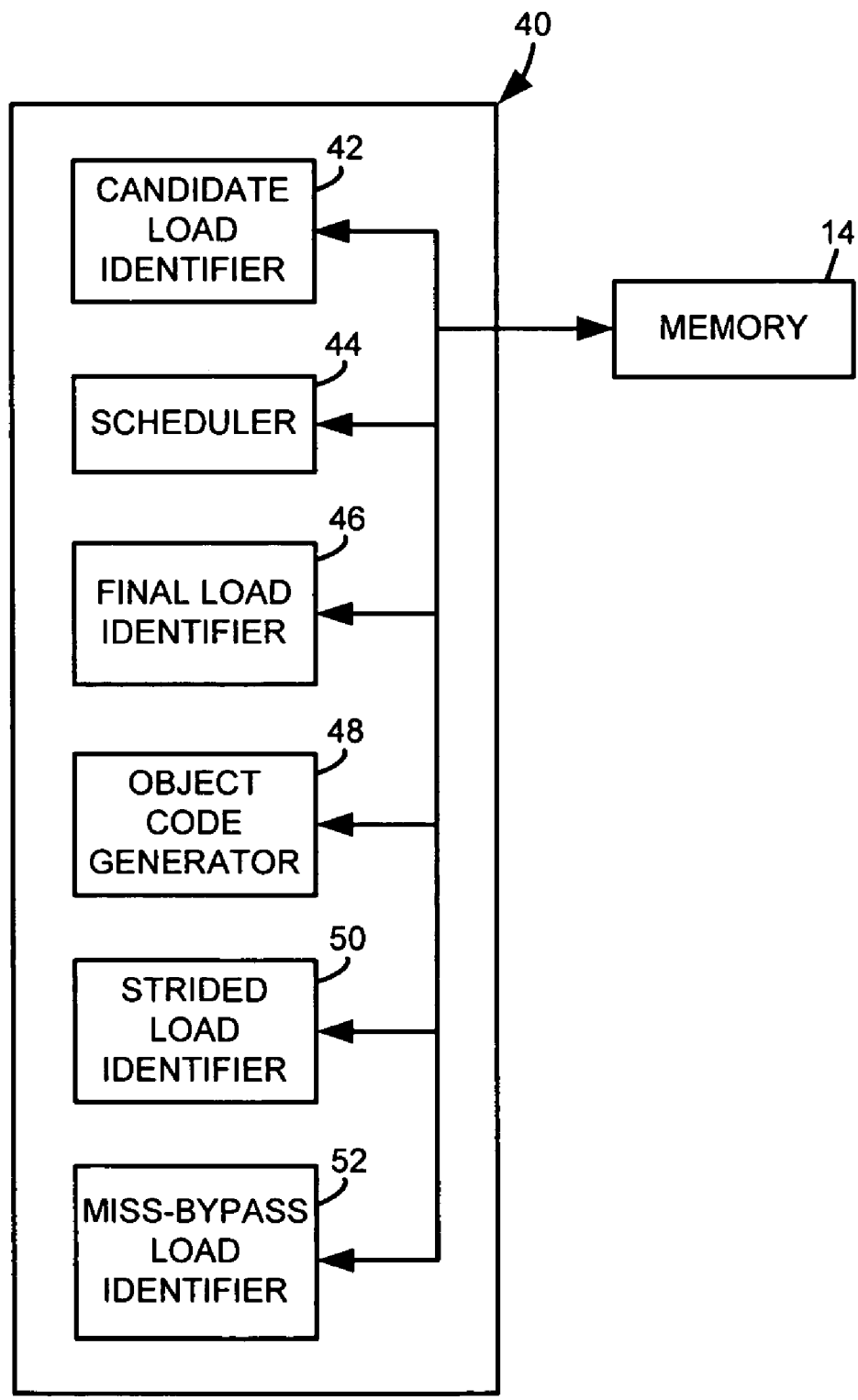
FIG. 2 is a schematic illustration of an example apparatus to manage μcache bypassing.

An example apparatus 40 to manage μcache bypassing to reduce misses of the μcache when executing a software program is shown in FIG. 2. As shown in FIG. 2, the example apparatus 40 acts upon a software program to be managed which is currently stored, at least in part, in some portion of the memory 14.

For the purpose of identifying candidate load instructions within the software program for possibly bypassing the μcache, the apparatus 40 is provided with a candidate load identifier 42. The candidate load identifier 42 reviews the software for candidate load instructions before the software is scheduled by the compiler. The candidate load identifier 42 identifies load instructions having (1) an expected latency greater than or equal to a first predetermined threshold (e.g., ≧T2 cycles), and (2) a bypass probability greater than or equal to a second predetermined threshold as candidate load instructions. The candidate load identifier 42 determines the expected latency of a given load instruction by determining a slack of the given load instruction in the dependency graph. For example, if the subject load instruction could be executed as early as cycle 1 and the associated use instruction could be executed as late as cycle 10, the slack is 10 cycles. Since the instructions examined by the candidate load identifier 42 are not yet scheduled, they are not yet associated with absolute schedule cycles. Instead, these instructions have the potential to be moved forward or back in the execution sequence relative to other instructions. The "slack" of a given load instruction is, thus, the potential time differences that can possibly be scheduled between the given load instruction and the use instruction needing the loaded data.

The illustrated apparatus 40 is also provided with a scheduler 44. The scheduler 44 functions as a conventional scheduler 44 in a conventional compiler with one modification. In particular, the scheduler 44 of FIG. 2 attempts to schedule the candidate load instructions (i.e., the load instructions identified by the candidate load identifier 42) to have a latency greater than or equal to a predetermined threshold. In this example, the predetermined threshold used by the scheduler 44 is T2, the latency of the L2 cache. While the scheduler 44 attempts this feat, other constraints may cause less than all of the candidate load instructions to have the desired latency. Indeed, it is possible that all, none or some of the candidate load instructions are so scheduled.

For the purpose of marking load instructions to bypass the μcache, the apparatus 40 of FIG. 2 is further provided with a final load identifier 46. The final load identifier 46 operates on the code as scheduled by the scheduler 44 to identify final load instructions. The final load identifier 46 identifies load instructions having (1) an actual (i.e., scheduled) latency greater than or equal to a first predetermined threshold (e.g., ≧T2), and (2) a bypass probability greater than or equal to a second predetermined threshold as final load instructions. The final load identifier 46 determines the actual latency of a given load instruction by determining a time difference between the time that a load instruction is scheduled to execute and the time at which a use instruction operating upon the data loaded by that use instruction is scheduled to execute. The final load identifier 46 marks load instructions to bypass the μcache by setting a flag in each of those load instructions in implementations supporting such flag setting (e.g., implementations using a processor from the Itanium® family).

For the purpose of generating object code from the scheduled software program, the apparatus 40 of FIG. 2 is further provided with an object code generator 48. The object code generator 48 is implemented as in a conventional compiler and functions in the conventional way.

To mark strided load instructions to bypass the μcache, the apparatus 40 of FIG. 2 is further provided with a strided load identifier 50. The strided load identifier 50 marks a strided load to bypass the μcache if: (1) the strided load instruction is located in a loop, and (2) the strided load instruction uses more than a predetermined amount of the μcache when the loop is executed. The strided load identifier 50 determines if the strided load instruction uses more than the predetermined amount of the μcache when the loop is executed by: (1) determining a number of trips through the loop in which the strided load instruction is executed; (2) multiplying the number of trips with a stride associated with the strided load instruction to develop a stride size value; (3) dividing the stride size value by a value representative of a size of the μcache to develop a memory usage percentage; and (4) comparing the memory usage percentage to the predetermined amount of the μcache. In the illustrated example, the strided load identifier 50 acts on the software prior to the candidate load identifier 42 to thereby potentially reduce the amount of code requiring analysis by the candidate load identifier 42 and the final load identifier 46, while simplifying the task of the scheduler 44.

As shown in FIG. 2, the apparatus 40 is also provided with a miss-bypass load identifier 52. The miss-bypass load identifier 52 operates after certain profile data has been developed by executing the object code one or more times under the assumption that the loads identified by the final load identifier 46 bypass the μcache. The miss-bypass load identifier 52 identifies load instructions which miss the μcache and wherein the cache line loaded by the load instructions is not reused. For each load instruction not bypassing the μcache from the previous identification phase, the miss-bypass load identifier 52 divides (a) a number of times the load instruction misses the μcache without the cache line loaded by the load instruction being reused by (b) a number of times the load instruction is executed to develop a ratio value. If the ratio value is greater than or equal to a predetermined ratio threshold, the miss-bypass load identifier 52 then marks the load instruction to bypass the μcache.

Once the miss-bypass load identifier 52 has analyzed all of the code, the object code generator 48 operates on the program or intermediate code as modified by the final load identifier 46, the strided load identifier 50, the scheduler 44 and the miss-bypass load identifier 52 to generate object code incorporating the load instructions marked to bypass the μcache. This completes the process of compiling the source code into object code to manage μcache bypassing to reduce the number of misses of the μcache.

As explained above, the illustrated apparatus 40 employs a number of compiler techniques such as dependence analysis and profiling to identify loads that should bypass the μcache and directly access the L2 cache. Thus, the example apparatus 40 is a compiler that operates on intermediate code to produce object code that enjoys more efficient usage of the μcache and, thus, fewer μcache misses.

An example software program for implementing the apparatus of FIG. 2, is shown in FIGS. 3-14. In this example, the program is for execution by the processor 12 and is embodied in software stored on a tangible medium such as a CD-ROM, a floppy disk, a hard drive, a digital versatile disk (DVD), or a memory associated with the processor 12, but persons of ordinary skill in the art will readily appreciate that the entire program or parts thereof could alternatively be executed by a device other than the processor 12 and/or embodied in firmware and/or dedicated hardware in a well known manner. For example, any or all of the candidate load identifier 42, the scheduler 44, the final load identifier 46, the object code generator 48, the strided load identifier 50, and/or the isolated load identifier 52 could be implemented by software, hardware, and/or firmware. Further, although the example program is described with reference to the flowcharts illustrated in FIGS. 3-14, persons of ordinary skill in the art will readily appreciate that many other method of implementing the apparatus 40 of FIG. 2 may alternatively be used. For example, the order of execution of the blocks may be changed, and/or the blocks described may be changed, eliminated, or combined.

Figure 3:
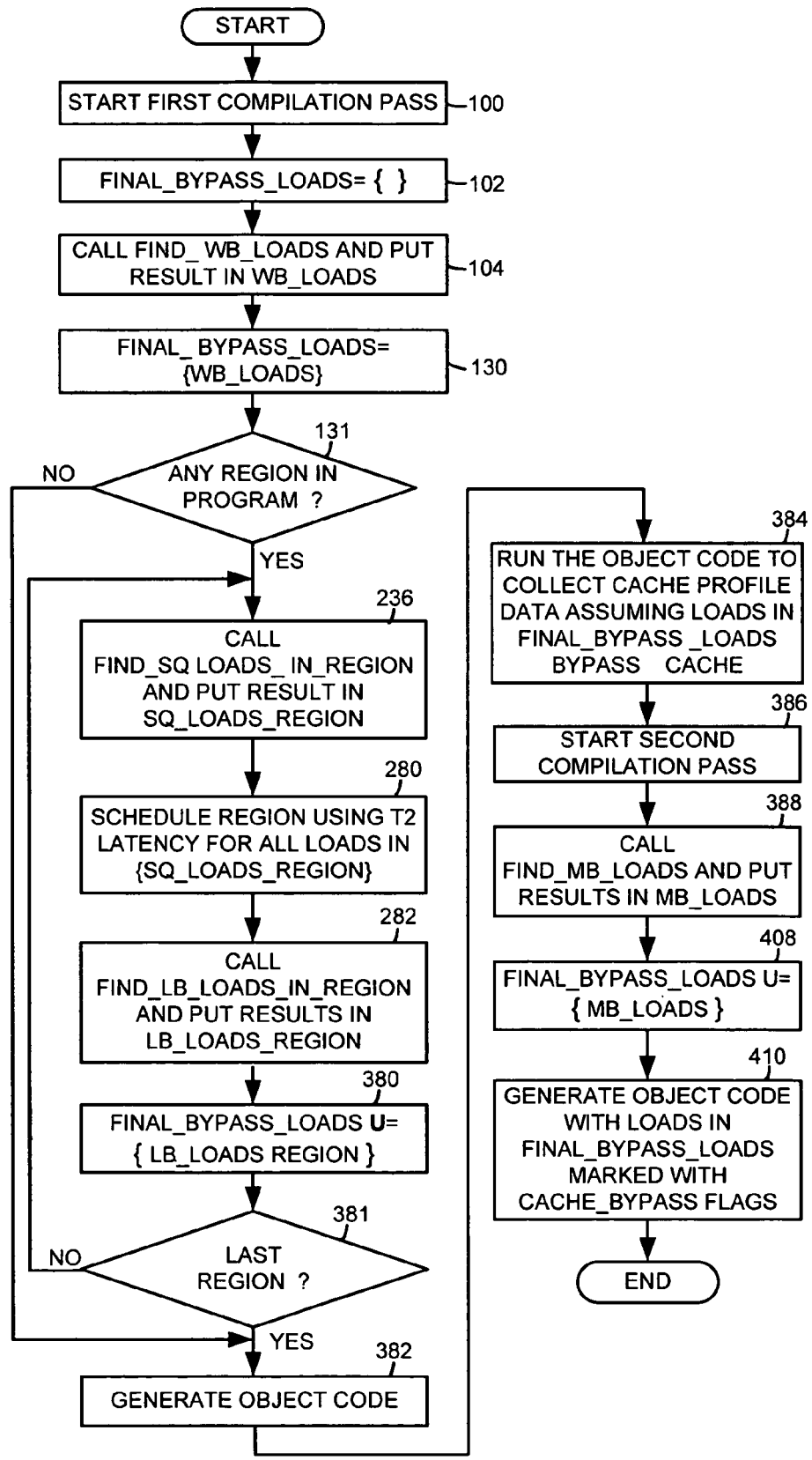
FIG. 3 is a flowchart illustrating an example program implementing the apparatus of FIG. 2.
Figure 4:
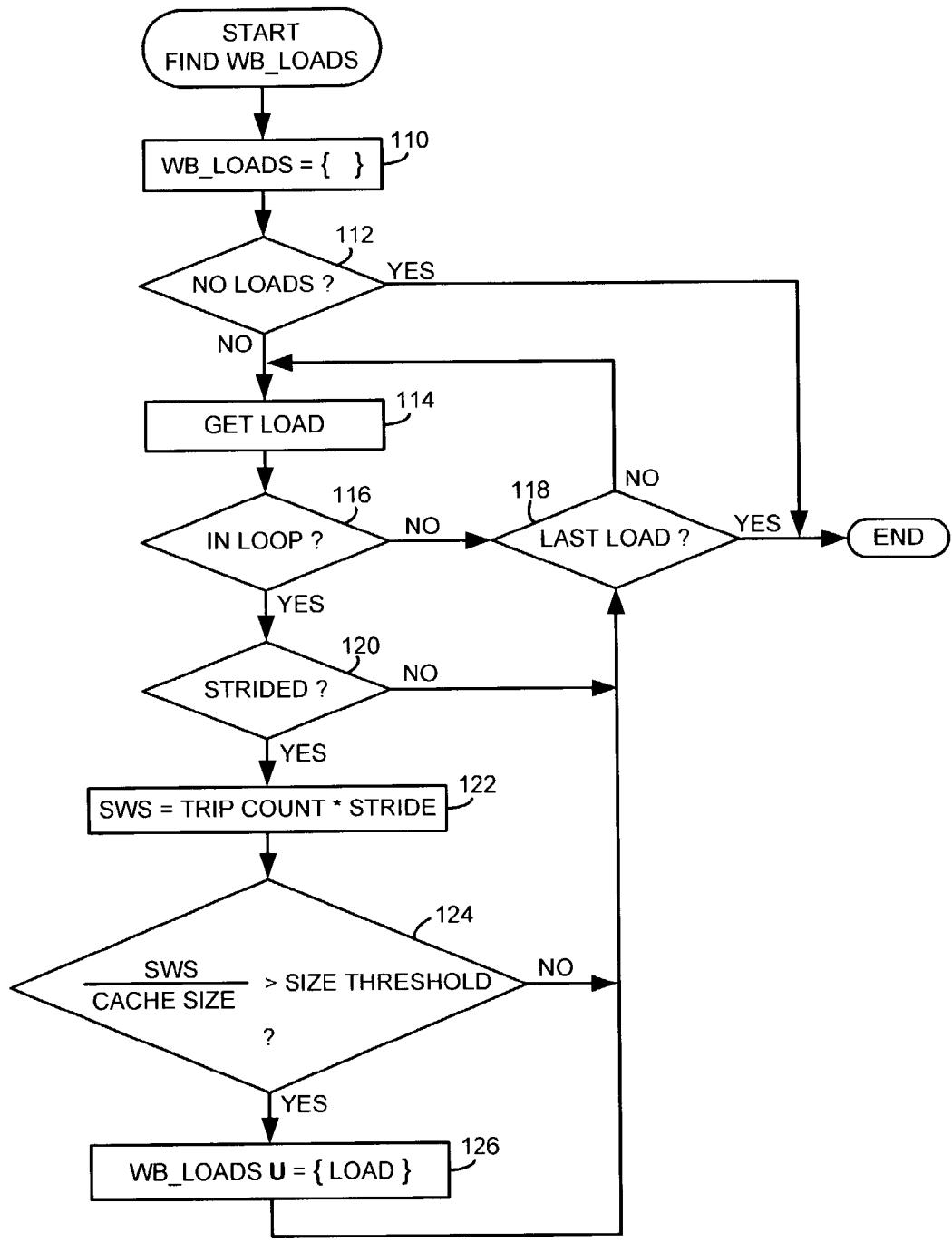
FIG. 4 is a flowchart illustrating an example Find WB_Loads routine called by the program of FIG. 3.

Turning to FIG. 3, the apparatus 40 initiates a first compilation pass (block 100) by clearing the Final_Bypass_Loads set to an empty set (block 102). The strided load identifier 50 is then activated (block 104) to identify strided load instructions for bypassing the μcache (block 104). In particular, as shown in FIG. 4, the strided load identifier 50 first clears the WB_Loads set to an empty set (block 110). Then the strided load identifier 50 begins reviewing the subject program to identify load instructions. If no load instructions are present in the program (block 112), the strided load identifier 50 returns WB_Loads as an empty set and control returns to block 130 (FIG. 3).

Assuming the program being processed includes a load instruction (block 112), the strided load identifier 50 retrieves the examined load instruction (block 114) to determine if it is located in a loop (block 116). If the load instruction is not located in a loop (block 116), the strided load identifier 50 continues searching the program for the next load instruction. If no further load instructions are present (block 118), control returns to block 130 of FIG. 3. If there are additional load instructions, control will continue to loop through blocks 114-118 until there are no further load instructions (block 118), or until a load instruction located in a loop is identified (block 116).

If a load instruction located in a loop is identified (block 116), the strided load identifier 50 determines whether the load instruction is strided (block 120). A load instruction is strided if it has a dominant stride. A dominant stride is a stride which occurs much more frequently than other strides. A stride for a load instruction is the difference between two successive addresses issued by the load instruction. If the load instruction is not strided (block 120), the strided load identifier 50 continues searching for strided load instructions (blocks 114-120), or exits if the last load instruction has been reviewed (block 118).

If the load instruction is strided (block 120), the strided load identifier 50 determines if the strided load instruction uses more than a predetermined amount of the μcache when the loop is executed. In particular, the strided load identifier 50 calculates a stride size value (SWS) by multiplying the number of trips the software takes through the loop hosting the load instruction (i.e., the trip count) by the dominant stride of the load instruction (block 122). The strided load identifier 50 then divides the stride size value (SWS) by the size of the μcache and compares the result to a predetermined threshold (e.g., a factor of 5 or greater) (block 124). If the quotient of the stride size value (SWS) and the μcache size exceeds the threshold (block 124), the strided load identifier 50 identifies the load instruction as a load that should bypass the μcache by adding it to the set WB_Loads (block 126). Control then returns to block 118. If the quotient of the strided sized value (SWS) and the μcache size does not exceed the threshold (block 124), control returns to block 118 without adding the load to the set WB_Loads.

Control continues to loop through blocks 114-126 until every load instruction is analyzed to see if it is a strided load instruction that should bypass the μcache. When this effort is completed (block 118), control returns to block 130 of FIG. 3.

At block 130, the final load identifier 46 adds the set of strided load instructions {WB$_{13}$ Loads} to the set of final bypass loads {Final_Bypass_Loads}.

As will be appreciated by persons of ordinary skill in the art, some sections of program have only a single execution path, while others have multiple paths proceeded by one or more decisions that direct branching of the control flow through the section. In this patent, a section of software program having one or more control flow paths, one or more exit points and a single entry point, is referred to as a "region." A section of a program within a region having only one control flow path between a single entry point and a single exit point is referred to as a "path." A region may include one or more paths.

After block 130, the apparatus 40 begins examining the software program (e.g., by looping through blocks 131-381) from the start of the program for candidate load instructions having a latency greater than or equal to a predetermined threshold. Prior art compilers normally assume that a load will hit μcache and schedules the load with T1 latency. If the load has a scheduling slack of T2 cycles, then the load may be scheduled with T2 cycle latency without impacting the critical path length. (A load having such scheduling slack is referred to herein as a "slack qualified load" or a "candidate bypass load.") Not every load with a scheduling slack of T2 is a slack qualified load. When a load with sufficient slack is identified as a slack qualified load and its latency is increased, the slacks of other loads may be impacted (e.g., a load originally having a T2 cycle slack may no longer have a T2 cycle slack after another slack qualified load is assigned T2 cycle latency). Depending on the order in which the slack qualified loads are identified, different identification orders may result in different sets of slack qualified loads. Thus, the apparatus 40 has the following objectives: (1) to maximize the number of slack bypass loads (weighted by their execution frequencies); and (2) to minimize the increase of the total schedule length.

As shown in FIG. 3, when a region (which may have a single path) that has not yet been analyzed remains in the program, the Find_SQ_Loads_In_Region routine is invoked at block 236. If a load is on multiple control flow paths of a scheduling region, we first determine if it should be a slack qualified load for individual paths, and then combine the information from all the paths to determine if the load should be a slack qualified load for the region. To do this, we define a parameter SQ_PROB as a value between 0 and 1. A load is a slack qualified load for a region if and only if it can be bypassed on SB_PROB portion of the paths, weighted by path frequencies. More precisely, let the bypass region probability (BRP) be the ratio of the total frequency of the paths on which the load can be bypassed over the region entry frequency. A load is a slack qualified load for a given region if and only if BRP (load)>SQ_PROB.

Figure 5:
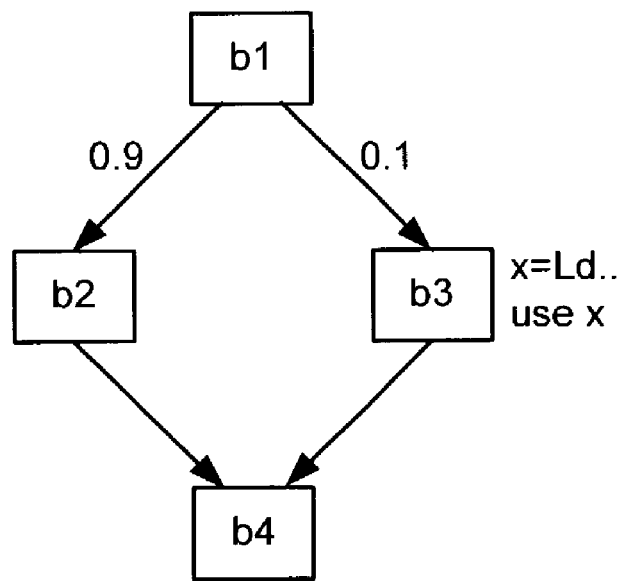
FIG. 5 is a schematic illustration of an example control flow.
Figure 6:
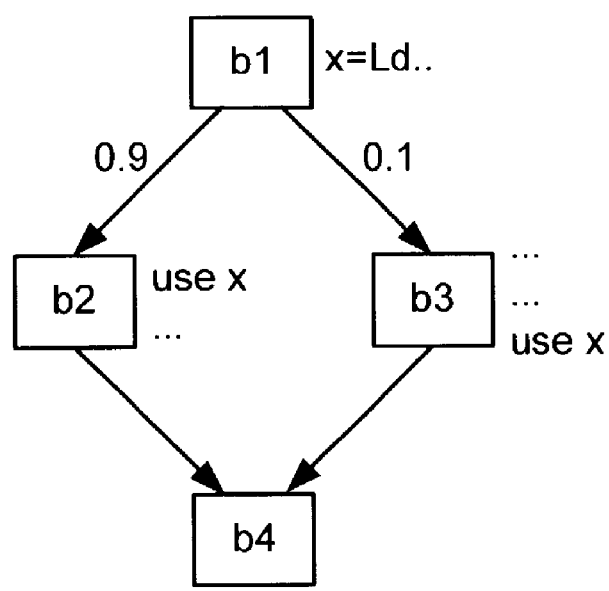
FIG. 6 is a schematic illustration of another example control flow.

There are two cases where a load can have a small BRP and thus cannot be bypassed. The first case is shown in FIG. 5. The load and its uses are on the same path in the illustrated region, but the frequency is low compared to the region frequency. In this case, the instruction scheduler 44 is unlikely to move the load from the low frequency block b3 to the high frequency block b1 or move the use from block b3 to b4, even though there is scheduling slack for the load and use. The second case is shown in FIG. 6. The load is used in multiple paths, but slack exists only on the infrequent path. In this case, the load should not be identified as a slack qualified load for the region, as doing so would penalize the execution of the load on the more frequent path in which the load should not be bypassed.

Figure 7:
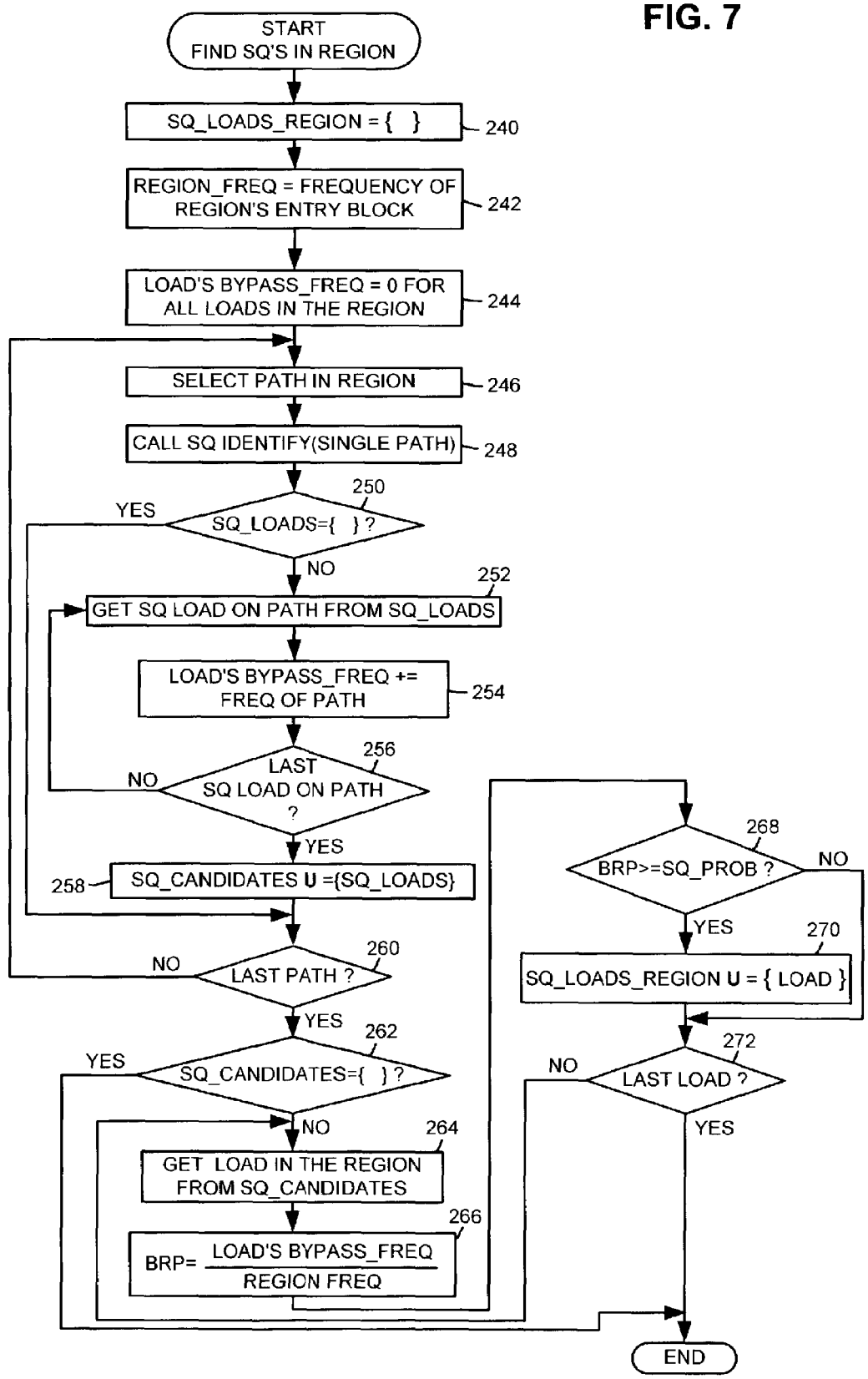
FIG. 7 is a flowchart illustrating an example Find_SQ-Loads_In_Region routine called by the program of FIG. 3.

Turning to FIG. 7, the Find_SQ_Loads_In_Region routine begins when the candidate load identifier 42 clears the SQ_Loads_Region set to an empty set (block 240). The candidate load identifier 42 then sets the region frequency variable to the frequency with which the entry block of the region is executed (block 242). For each of the load instructions in the region, the candidate load identifier 42 then sets a corresponding load's Bypass_Freq equal to zero (block 244).

The candidate load identifier 42 next selects one of the paths in the region for analysis (block 246). It then calls the SQ Identify (Single Path) routine (block 248). The SQ Identify (Single Path) routine develops a set of candidate loads having a slack beyond a certain threshold. Those candidate loads are returned by the SQ Identify (Single Path) routine in the set SQ_Loads.

Figure 8:
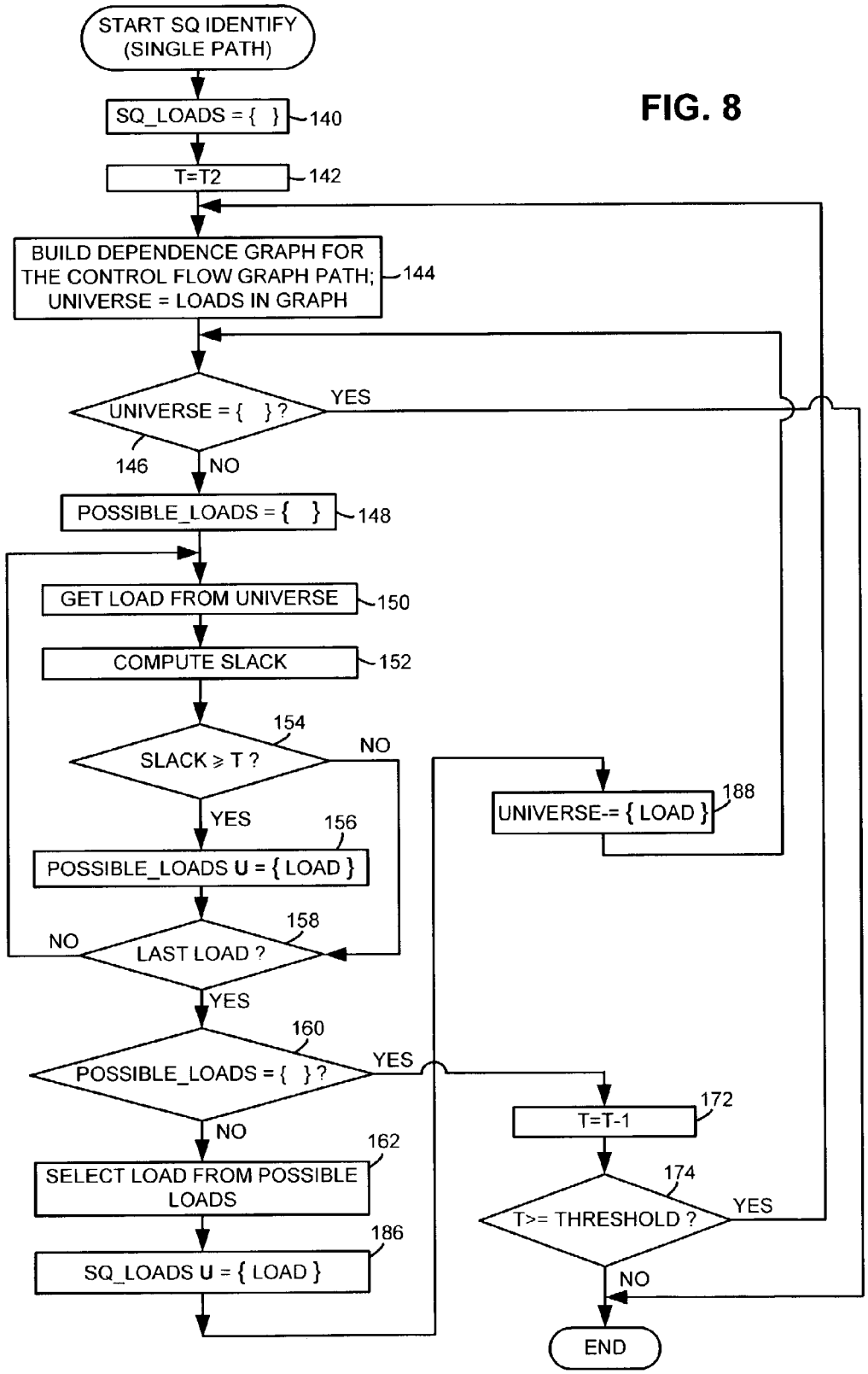
FIG. 8 is a flowchart illustrating an example SQ Identify (Single Path) routine called by the program of FIG. 7.
Figure 9:
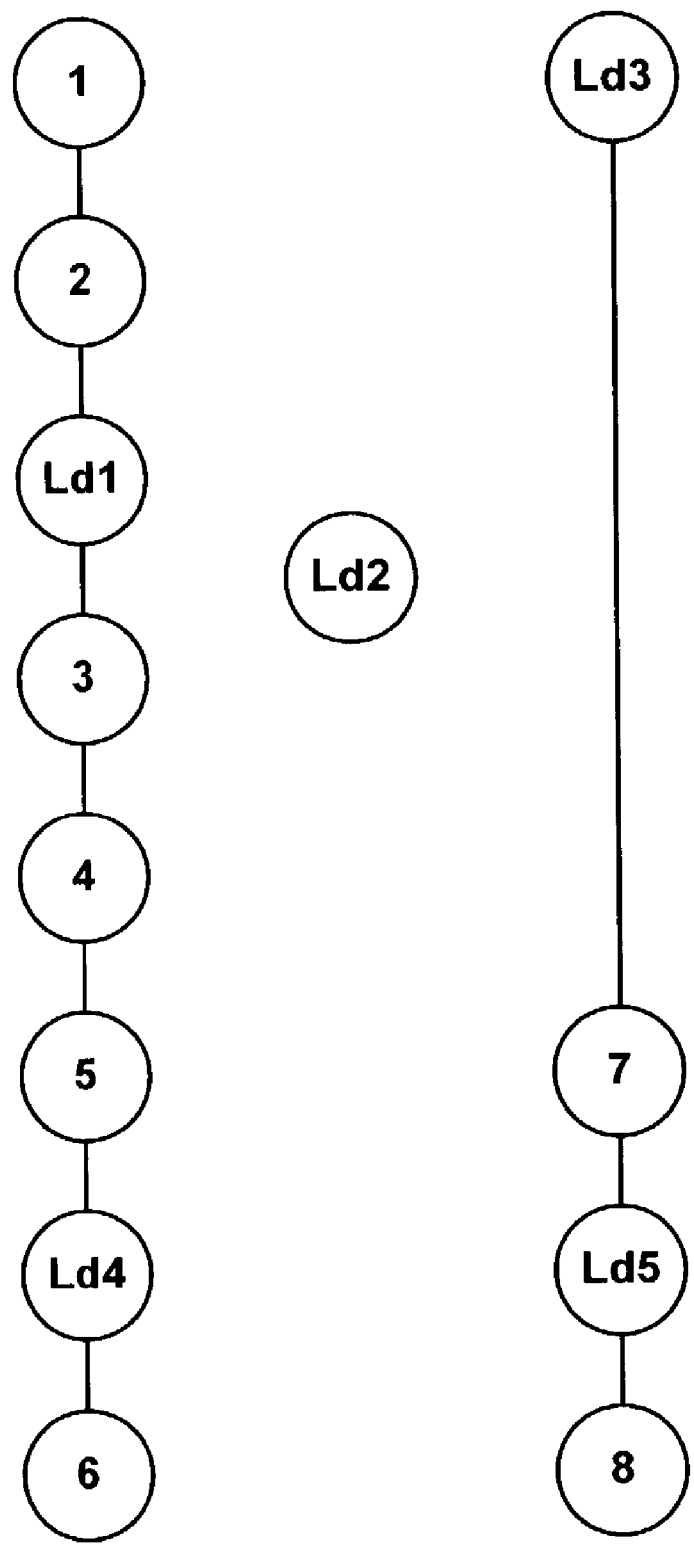
FIG. 9 is an illustration of an example dependence graph.

Turning to FIG. 8, the SQ_Identify (Single Path) routine begins when the candidate load identifier 42 clears the SQ_Loads set to an empty set (block 140) and sets a threshold (T) to T2 (i.e., the latency of the L2 cache) (block 142). The candidate load identifier 42 then builds a dependence graph for the control flow graph path being analyzed (block 144). An example dependence graph is shown in FIG. 9. In this example, each circle represents an instruction. Numbered instructions are, for example, use instructions (i.e., an instruction operating on data previously loaded into the cache such as an add instruction). Instructions labeled "Ld" followed by a reference number are load instructions. A line connecting two instructions represents a dependency of the lower instruction on the higher positioned instruction in the graph. For example, in FIG. 9 instruction 2 depends from instruction 1 and, thus, cannot be executed until instruction 1 is executed. Once the dependence graph is constructed, the set "Universe" is defined to include each load instruction in the path (e.g., Ld1, Ld2, Ld3, Ld4 and Ld5) (block 144).

At block 146, the candidate load identifier 42 determines if the set Universe has any members. If not (block 146), the SQ_Identify (Single Path) routine terminates, and control returns to block 250 of FIG. 7. If the set Universe has at least one member (block 146), the candidate load identifier 42 clears the set Possible_Loads to an empty set (block 148).

The candidate load identifier 42 next retrieves a load from the Universe set (e.g., Ld1) (block 150) and computes the slack of that load (block 152). The slack is computed as the difference between the latest and the earliest cycle of the load in the dependency graph. Once the slack is computed (block 152), the candidate load identifier 42 compares the slack to the threshold T (block 154). If the slack is greater than or equal to the threshold T (block 154), the load (e.g., Ld1) is added to the set Possible_Loads (block 156). If the slack is less than the threshold T (block 154), the load (e.g., Ld1) is not a possible candidate load and is, thus, not added to the set Possible_Loads. After determining whether the load being analyzed (e.g., Ld1) has sufficient slack to be a possible candidate load (block 154), the candidate load identifier 42 determines if there are other load instructions in the dependence graph (block 158). If there are other loads, control returns to block 150 where analysis of the slack of the next load instruction begins. Otherwise, when the last load instruction has been analyzed (block 158), control proceeds to block 160.

At block 160, the candidate load identifier 42 determines whether the Possible_Loads set has any members. If it does not have any members (block 160), control proceeds to block 172 where the threshold T is decremented by, for example, 1 cycle. The candidate load identifier 42 then determines if the threshold T has dropped below a predetermined minimum value (block 174). If so, the SQ Identify (single path) routine terminates and control returns to block 250 of FIG. 7. Otherwise, control returns to block 146. As will be appreciated by persons of ordinary skill in the art, lowering the threshold T potentially increases the number of load instructions that can be identified as possible candidate loads because less slack is required to be so designated (see block 154). Sweeping more load instructions into the set of possible candidates by lowering the threshold may increase the schedule length of the program. However, trading off schedule length for cache performance may improve overall performance of the program.

Returning to block 160, assuming the Possible_Loads set is not empty, the candidate load identifier 42 selects a load from the set of possible candidates (i.e., the Possible_Loads set) (block 162). The optimal solution for selecting between the possible candidate loads appears to be NP hard. However, the fewer dependencies a possible candidate load has with respect to other possible candidate loads, the fewer possible candidate loads will be impacted by an increase in the latency of the candidate load. Thus, if a possible candidate load has no dependence with another candidate load, then it can always be selected as a candidate load. With these principles in mind, the candidate load identifier 42 selects a load from the possible candidate loads as shown in FIG. 10.

Figure 10:
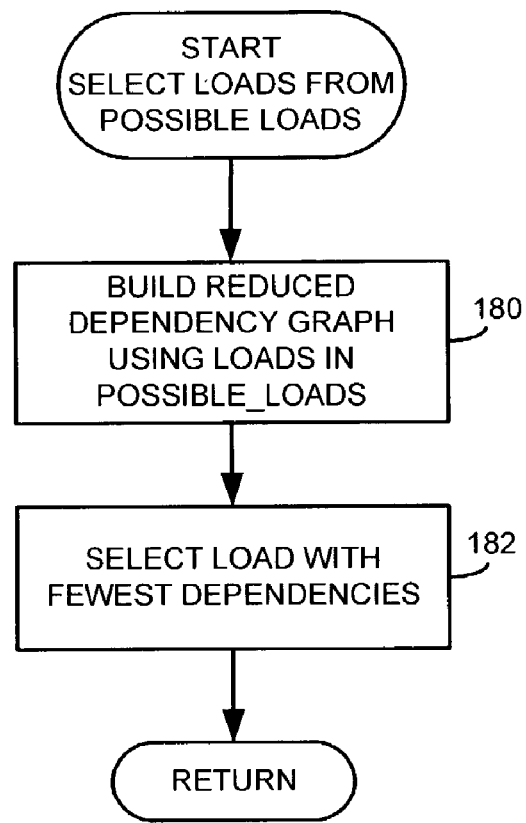
FIG. 10 is a flowchart illustrating an example Select Loads From Possible Loads routine called by the program of FIG. 8.
Figure 11:
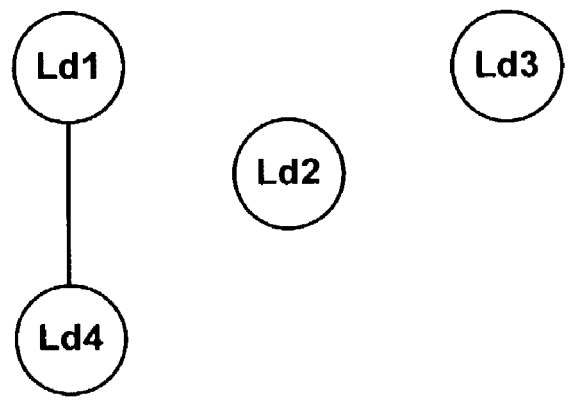
FIG. 11 is an illustration of an example reduced dependence graph.

Turning to FIG. 10, the candidate load identifier 42 begins the process of selecting a load from the possible candidate by building a reduced dependence graph using only load instructions from the set Possible_Candidates (block 180). An example reduced dependence graph based on the example of FIG. 9 is shown in FIG. 11. The example of FIG. 11 assumes that load instructions Ld1-Ld4 (see FIG. 9) are in the set Possible_Candidates, and load instruction Ld5 (see FIG. 9) has insufficient slack to be included in that set. Once the reduced dependence graph is constructed (block 180), the candidate load identifier 42 selects a load instruction with the fewest dependency edges from the graph using a conventional sort algorithm (block 182). In the example of FIG. 11, load instructions Ld1 and Ld4 each have one dependency edge, whereas load instructions Ld2 and Ld3 each have no dependency edges. Therefore, the candidate load identifier 42 will select one of load instruction Ld2 and load instruction Ld3. In the event two or more load instructions have the same number of dependency edges, the selection between those instructions is arbitrary.

Returning to FIG. 8, the candidate load identifier 42 adds the load instruction (e.g., Ld2) selected from the Possible_Loads set to the set of candidate or slack qualified loads SQ_Loads (block 186). It also removes the selected load from the set "Universe" (block 188). The candidate load identifier 42 then checks to see if the set "Universe" is empty (block 146). If not, control returns to block 148 where the set Possible_Loads is cleared and the process of computing the slacks for the loads remaining in the Universe set is repeated to see whether any loads in the Universe set should be identified as possible candidate loads in view of the increased latency due to the load(s) added to the SQ_Loads set.

Control continues to loop through blocks 146-188 until the set "Universe" becomes empty (block 146) or the set "Possible_Loads" is determined to have no member at bock 160. In the first case, the process terminates. In the second case, the threshold T is reduced by one cycle (block 172) and compared to the predetermined threshold (block 174) as explained above. If the threshold is still exceeded (block 174), control loops back to block 146. Otherwise, the SQ_Identify (Single Path) routine terminates and control returns to block 250 (FIG. 7).

Returning to FIG. 7, after the SQ Identify (Single Path) routine is executed (block 248), the candidate load identifier 42 determines whether the set SQ_Loads has any members (block 250). If there are no members in the SQ_Loads set (block 250), control proceeds to block 260. Otherwise, control proceeds to block 252.

Assuming, for purposes of example, that the SQ_Loads set is not empty (block 250), the candidate load identifier 42 retrieves one of the candidate loads from the SQ_Load set (block 252). It then adds the frequency with which the path on which the load is located is executed to the load's Bypass_Freq for the subject load (block 254). The candidate load identifier 42 then determines if there is any other load instruction in the SQ_Loads set (block 256). If so, control again loops through blocks 252-256. Control continues to loop through blocks 252-256 until all of the loads in SQ_Loads have been analyzed (block 256).

The candidate load identifier 42 then adds the set SQ_Loads to the set SQ_Candidates (block 258) and determines if there are any more paths to analyze in the region (block 260). If there are more paths to analyze (block 260), control returns to block 246 where the next path is then analyzed as explained above. Control continues to loop through blocks 246-260 until every path in the region has been analyzed for candidate loads (block 260).

Assuming for purposes of illustration that the set SQ_Candidates is not empty (block 262), the candidate load identifier 42 enters a loop (blocks 264-272) where it analyzes each load in the set SQ_Candidates to see if it has a bypass probability greater than or equal to a predetermined probability threshold. In particular, the candidate load identifier 42 retrieves a first load from the SQ_Candidates set (block 264). It then calculates the bypass region probability (BRP) for the load by dividing the Load's_Bypass_Frequency by the Region's frequency (block 266). The candidate load identifier 42 then compares the calculated BRP to a probability threshold (SQ_PROB) (block 268). SQ_Prob is a value between 0 and 1 (e.g., 0.1).

If the BRP of the load exceeds the SQ_Prob threshold (block 268), then the candidate load identifier 42 identifies the load as a candidate load by adding it to the set SQ_Loads_Region (block 270). If the BRP of the load does not exceed the SQ_Prob threshold (block 268), then control proceeds to block 272.

If there are more loads to analyze in the SQ_Candidates set (block 272), control again loops through blocks 264-272. Otherwise, the Find_SQ_Loads_In_Region routine terminates, and control returns to block 280 of FIG. 3.

Returning to FIG. 3, when the Find_SQ_Loads_In_Region routine returns (block 236), the scheduler 44 schedules the region (block 280). In doing so, the scheduler 44 attempts to schedule a T2 latency for each of the candidate loads in SQ_Loads_Region. As explained above, due to various constraints, the scheduler 44 may schedule none, some, or all of the candidate loads in SQ_Loads_Region to have a T2 latency.

To determine which of the loads in the scheduled region are latency bypass loads, the Find_LB_Loads_In_Region routine is called and the returned results are located in LB_LOADS_Region (block 282). If a load is on multiple control flow paths of a scheduling region, we first determine if it should be a latency bypass load for individual paths, and then combine the information from all the paths to determine if the load should be a latency bypass load for the scheduled region. Bypass load probability (BLP) is the ratio of the total frequency of the paths on which the load can be bypassed over the load frequency. A load is a latency bypass load for a region if and only if BLP(load)>LB_PROB where LB_PROB is a probability threshold for identifying latency bypass loads. Notice that BLP is slightly different from BRP. For the case shown in FIG. 5, BLP is 100% and BRP is only 10%. Even though the load's path frequency is low compared to the region frequency, the load can still be bypassed as the instruction scheduling has already been done and the load and its use is already separated by at least T2 cycles. For the case is shown in FIG. 6, both BLP and BRP are 10%.

Figure 12:
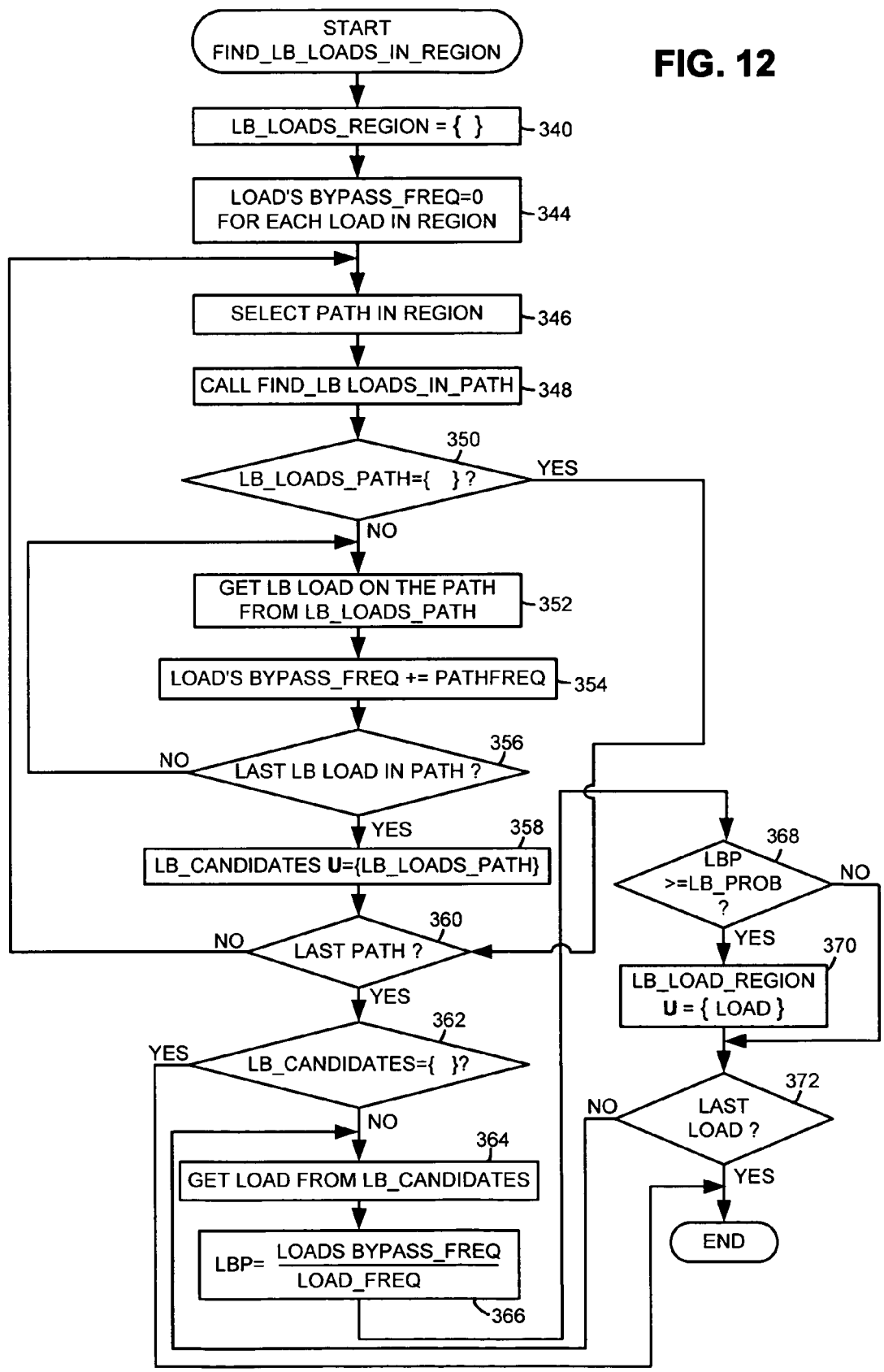
FIG. 12 is a flowchart illustrating an example Find_LB_Loads_In_Region routine called by the program of FIG. 3.

Turning to FIG. 12, the Find_LB_Loads_In_Region routine begins when the final load identifier 46 clears the LB_Loads_Region set to an empty set (block 340). For each of the load instructions in the region, the final load identifier 46 then sets a corresponding variable Load's_Bypass_Freq equal to zero (block 344).

The final load identifier 46 next selects one of the paths in the region for analysis (block 346). It then calls the Find_LB_Loads_In_Path routine (block 348). The Find_LB Loads_In_Path routine develops a set of latency bypass loads having a scheduled latency greater than or equal to a certain threshold. Those latency bypass loads are returned by the Find_LB Loads_In_Path routine in the set LB_Loads_Path.

In addition to the dependence constraints among instructions, many other architectural and microarchitectural constraints, such as the width of the machine and the bundling limitations may affect the final schedule after the instructions are scheduled. In particular, a load that is not identified as a slack qualified load may be scheduled in such a way that its results are not used in the next T2 cycles. These loads should be identified as latency bypass loads which bypass the μcache. When such circumstances occur, a load which was not identified by the candidate load identifier 42 is selected as a latency bypass load. On the other hand, a candidate load (i.e., slack qualified load) selected by the candidate load identifier 42 is not guaranteed to be scheduled with T2 latency by the scheduler 44. The instruction scheduler 44 may not be able to utilize the available slack due to microarchitectural or other constraints. In such circumstances, the slack qualified load will not be identified as a final bypass load.

Identifying latency bypass loads is easier than identifying candidate loads because the order of identification is unimportant. A load is a latency bypass load if and only if all of its uses are at least T2 cycles after the subject load instruction is scheduled; independent of other latency bypass loads.

Figure 13:
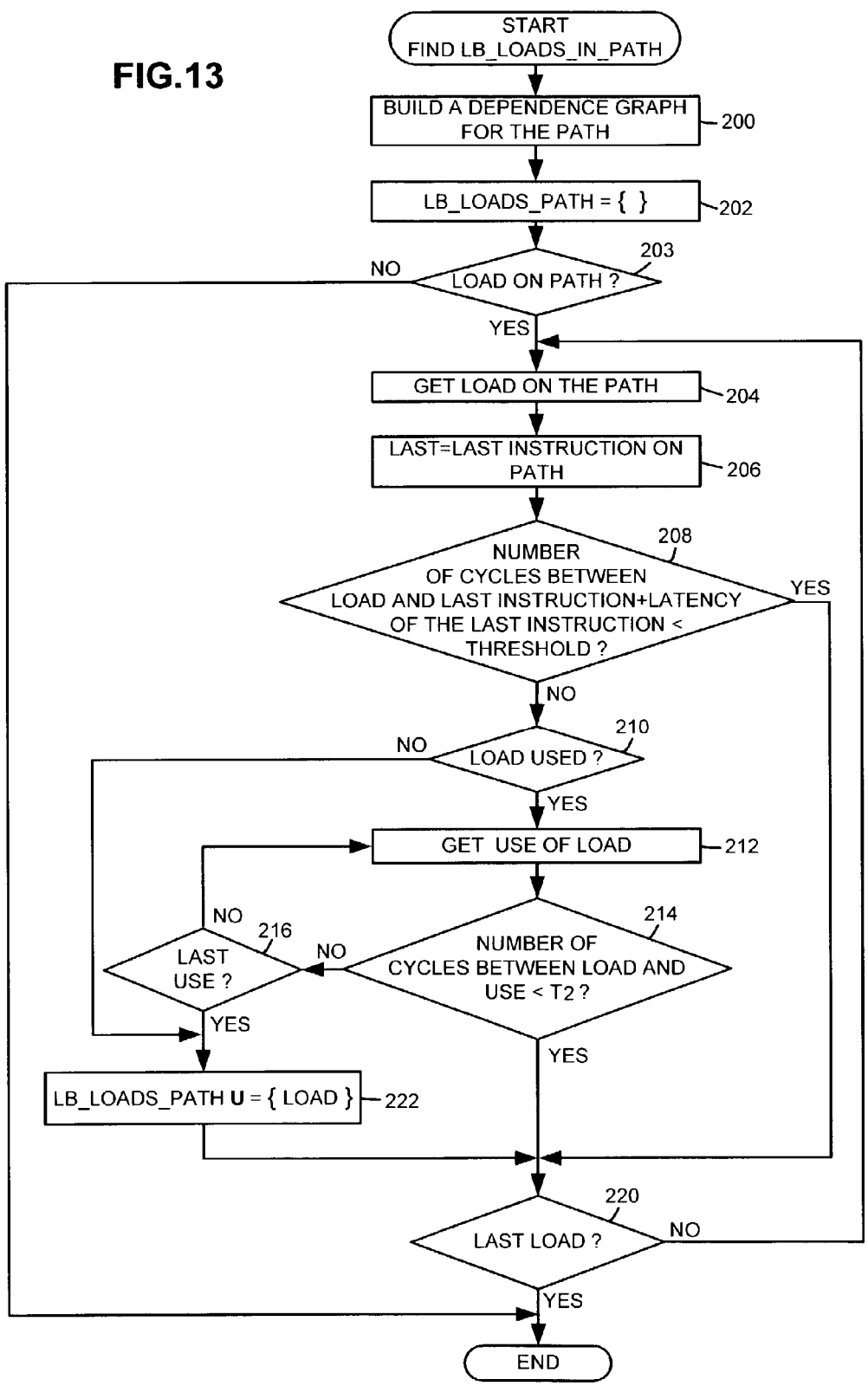
FIG. 13 is a flowchart illustrating an example Find_LB_Loads_In_Path routine called by the program of FIG. 12.

Turning to FIG. 13, the Find_LB_Loads_In_Path routine is initiated when the final load identifier 46 builds a dependence graph for the path (block 200). The dependence graph is similar to that shown in FIG. 9, except, in this instance, the dependence graph is based on the schedule developed by the scheduler 44. Therefore, the order of the load and use instructions in the dependence graph developed at block 202 will typically be different from the order of steps in the dependence graph developed at block 144 of FIG. 8.

Once the dependence graph is developed (block 200), the final load identifier 46 clears the set LB_Loads_Path to an empty set (block 202). The final load identifier 46 then determines if there are any loads on the path (block 203). If there are no loads on the path (block 203), the Find LB_Loads_In_Path routine terminates. Otherwise, the final load identifier 46 retrieves the first scheduled load on the path to determine if it is a latency bypass load as explained below (block 204). In particular, the last instruction on the path is identified (block 206). If the number of cycles between the load instruction being analyzed and the last instruction (plus the latency of the last instruction) is less than a predetermined threshold (e.g., T2) (block 208), then control proceeds to block 220. If there are no other load instructions on the path (block 220), the Find_LB_Loads_In_Path routine terminates. Otherwise, control returns to block 204.

Assuming that the number of cycles between the load instruction being analyzed and the last instruction (plus the latency of the last instruction) is greater than or equal to the threshold (block 208), the final load identifier 46 determines whether the data loaded by the subject load instruction is used by an instruction in the path (block 210). If that data is not used (block 210), control proceeds to block 222 where the load instruction is identified as a latency bypass load. Otherwise, control proceeds to block 212.

Assuming the load is used (block 210), the final load identifier 46 determines if the scheduled latency between any instruction that uses the data loaded by the load instruction and the load instruction itself is less than the threshold (block 214). If so, then the load instruction is not a latency bypass load so control exits the loop defined by blocks 212-216 where the final load identifier 46 determines if there are any more load instructions to analyze in the dependence graph (block 220). If, however, the number of cycles between a load instruction and each and every use instruction on the path that operates on the data loaded by the load instruction is greater than or equal to the threshold (e.g., T2) (block 216), then the final load identifier 46 adds that load instruction to the set LB_Loads_Path (block 222). Control then proceeds to block 220.

More specifically, at block 212, the final load identifier 46 retrieves the first use instruction operating on the data loaded by the subject load instruction. The final load identifier 46 then determines if the number of cycles between the subject load instruction and the use instruction is greater than or equal to the threshold (e.g., T2) (block 214). If so, control proceeds to block 220. Otherwise, the final load identifier 46 determines if the data loaded by the load instruction is used by any other use instruction in the path (block 216). If the data is used by another instruction (block 218) control returns to block 212 where that use instruction (block 218) is retrieved (block 212) and analyzed (block 214) as explained above. Control continues to loop through blocks 204-222 until every load instruction on the path has been analyzed (block 220). Once that analysis has been completed, the LB_Loads_In_Path routine ends and control returns to block 350 (FIG. 12).

After the Find_LB Loads_In_Path routine is executed (block 348), the final load identifier 46 determines whether the set LB_Loads_Path has any members (block 350). If there are no members in the LB_Loads_Path set (block 350), control proceeds to block 360. Otherwise, control proceeds to block 352.

Assuming, for purposes of example, that the LB_Loads_Path set is not empty (block 350), the final load identifier 46 retrieves one of the final loads from the LB_Load_Path set (block 352). It then adds the frequency with which the path on which the load is located is executed to the load's Bypass_Freq (block 354). The final load identifier 46 then determines if there is any other load instruction in the LB_Loads_Path set (block 356). If so, control again loops through blocks 352-356. Control continues to loop through blocks 352-356 until all of the loads in LB_Loads_Path have been analyzed (block 356).

The final load identifier 46 then sets LB_Candidates to LB_Loads_Path (block 358) and determines if there are any more paths to analyze in the region (block 360). If there are more paths to analyze (block 360), control returns to block 346 where the next path is then analyzed as explained above. Control continues to loop through blocks 346-360 until every path in the region has been analyzed for candidate loads (block 360).

After all paths have been so analyzed (block 360), the final load identifier 46 checks to determine if the set LB_Candidates includes any members (block 362). If it does not contain any members (block 362), there are no candidate loads in the region, the Find_LB_Loads_In_Region routine terminates, and control returns to block 380 in FIG. 3.

Assuming for purposes of illustration that the set LB_Candidates is not empty (block 362), the final load identifier 46 enters a loop (blocks 364-372) where it analyzes each load in the set LB_Candidates to see if it has a bypass probability greater than or equal to a predetermined threshold. In particular, the final load identifier 46 retrieves a first load from the LB_Candidates set (block 364). It then calculates the latency bypass region probability (LBP) for the load by dividing the load's Bypass_Freq by the frequency with which the load is executed Load_Freq (block 366). The final load identifier 46 then compares the calculated LBP to a probability threshold (LB_PROB) (block 368). LB_Prob is a value between 0 and 1 (e.g., 0.1).

If the LBP of the load exceeds the LB_Prob threshold (block 368), then the final load identifier 46 identifies the load as a latency bypass load by adding it to the set LB_Loads_Region (block 370). If the LBP of the load does not exceed the LB_Prob threshold (block 368), then control proceeds to block 372.

If there are more loads to analyze in the LB_Candidates set (block 372), control again loops through blocks 364-372. Otherwise, the Find_LB_Loads_In_Region routine terminates, and control returns to block 380 of FIG. 3. The final load identifier 46 then identifies the latency bypass loads in the LB_Loads_Region set as final bypass loads by placing those loads in the set Final_Bypass_Loads (block 380).

If every region in the software program has been analyzed (block 381), control proceeds to block 382. Otherwise, control returns to block 236 where the next region is analyzed as explained above. Control continues to loop through blocks 236-381 until the entire software program has been scheduled.

Assuming that the entire software program has been scheduled and analyzed for latency bypass loads (block 381), the object code generator 48' then converts the scheduled software program to object code (block 382). The object code is then executed. The program is profiled to identify the miss-bypass loads that frequently miss μcache and are not reused. The cache profiling collects for each load the number of times the load misses μcache and the loaded cache line is not reused. It also collects the total number of times the load is executed. The algorithm proposed by Johnson et al., Run-time cache bypassing, IEEE Transactions On Computers, Volume 48, Issue 12, December 1999 is employed to identify miss-bypass loads that miss μcache and are not reused. The set of loads in Final_Bypass_Loads are not profiled and will not access μcache during cache profiling.

A load may miss μcache and not be reused during only part of its execution. Miss and not reuse probability (MNRP) is the ratio of the number of times a load misses the μcache and is not reused over the total number of times the load is executed. A load is a miss-bypass load if and only if MNRP (load) >MB_PROB, where MB_PROB is a threshold value for the miss-bypass loads. These miss bypass loads are assigned T2 latencies and marked with μcache bypassing flags.

Notice that the set of miss-bypass loads may overlap with the set of strided loads. When a load instruction sweeps through μcache as explained above, it will be identified as a strided load. Strided loads are easier to identify than miss-bypass loads.

Figure 14:
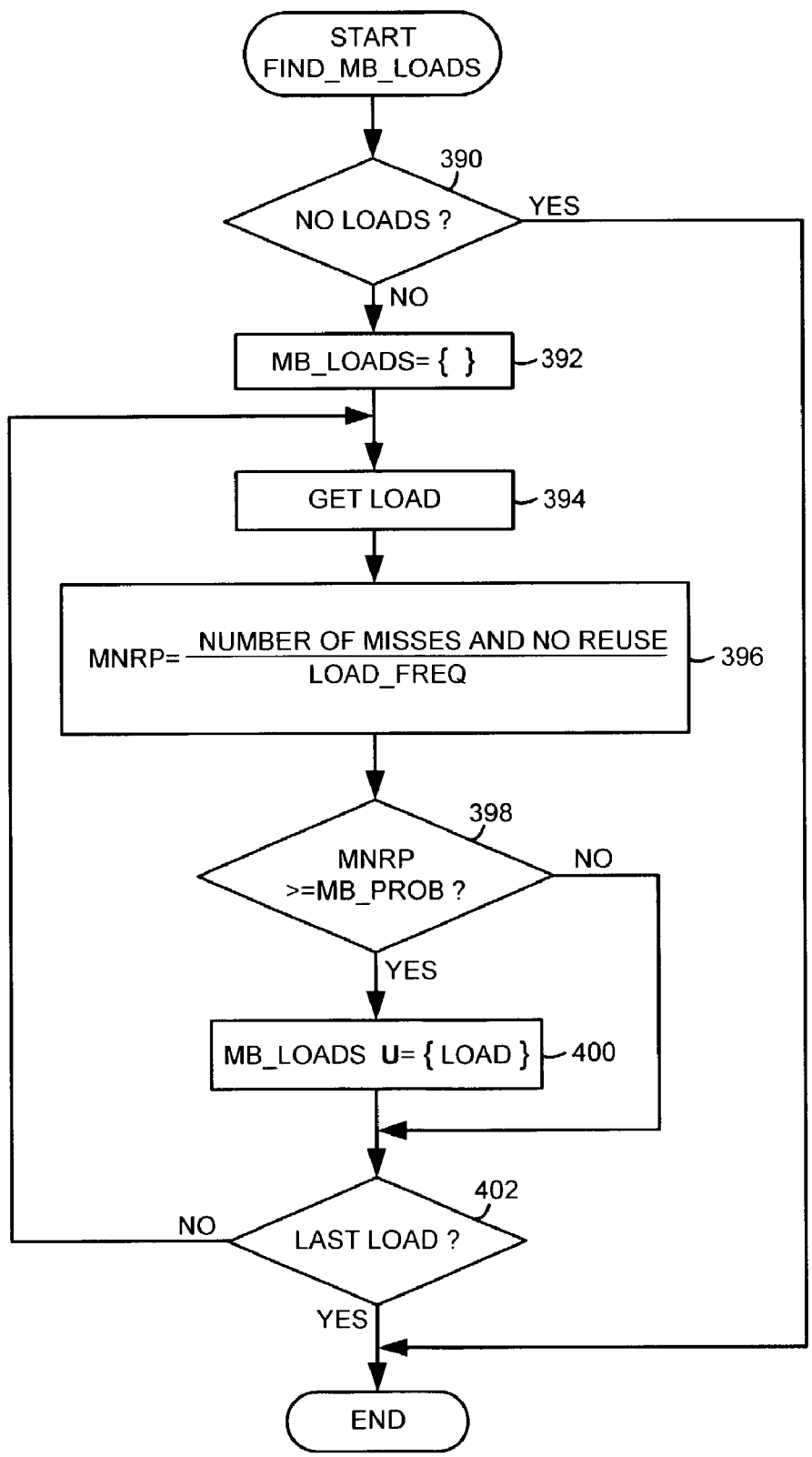
FIG. 14 is a flowchart illustrating an example Find_MB_Loads routine called by the program of FIG. 3.

With the profile data compiled, the second compilation pass is initiated (block 386) by calling the Find_MB_Loads routine (block 388). As shown in FIG. 14, the Find_MB_Loads routine begins when the miss-bypass load identifier 52 determines if there are any profiled load instructions in the software program being analyzed (block 390). If no such instructions exist (block 390), the Find_MB_Loads routine terminates and control returns to block 408 of FIG. 3.

Assuming, for purposes of explanation, that there are profiled load instructions in the software (block 390), the miss-bypass load identifier 52 clears the set MB_Loads to an empty set (block 392). It then retrieves the first profiled load instruction in the software program (block 394). The miss-bypass load identifier 52 then divides the number of times the load instruction misses the μcache without the loaded data being reused, by the frequency with which that load instruction is executed (Load_Freq) to determine a miss and not reuse probability (MNRP) (block 396).

The miss-bypass load identifier 52 then compares the calculated MNRP value to a threshold (MB_PROB) (block 398). If the MNRP of the load being analyzed exceeds the threshold (block 398), the load instruction is identified as a miss-bypass (MB) instruction by adding the load to the set MB_Loads (block 400). If the MNRP of the load does not exceed the MB_Prob threshold (block 398), block 400 is skipped and control proceeds to block 402.

At block 402, the miss-bypass load identifier 52 determines if there are more profiled load instructions to analyze. If so, control returns to block 394. Otherwise, the Find_MB_Loads routine terminates. Control continues to loop through blocks 394-402 until all loads have been analyzed (block 402).

Returning to FIG. 3, after the Find_MB_Loads routine terminates, the miss-bypass (MB) loads are added to the set Final_Bypass_Loads (block 408). The object code generator 48 then generates the object code for the software with the loads identified in the Final_Bypass_Loads set marked to bypass the μcache. The process of FIG. 3 then terminates.

The sets of candidate loads and latency bypass loads are intrinsic to the application program and the compiler optimizations used, independent of the cache configurations. The sets of strided and miss-bypass loads, on the other hand, are a function of cache configurations. With smaller μcache, more loads will have strided working set size greater than the μcache size, and potentially more strided loads can be identified to bypass the μcache. Similarly, with smaller μcache, more loads will miss μcache and potentially more miss-bypass loads can be identified.

Notice that, the compiler can only mark a load as either bypassing μcache or not bypassing μcache, but not both. It can happen that a load instruction may be bypassed only along some of the execution paths and cannot be bypassed along other paths. In other words, the bypassing probability of a candidate (slack qualified) load and/or a latency bypass load can be less than 100%. Experimental results indicate that a load usually has a bypassing probability of either greater than 90%, or less than 10%. This bi-modal property enables a simple compiler heuristic that selects the loads with bypassing probability greater than 50% to work well.

Similarly, the cache profiling may determine that a load instruction can be bypassed part of the time. Experimental results indicate that the bypassing probability of a miss-bypass load is usually low. Only a small percentage of loads have bypassing probability higher than 50%. For the rest of the loads, statically marking them to bypass µcache may be ineffective, and a more dynamic scheme may be needed.

An interesting observation is that, even though µcache bypassing reduces µcache misses, the bypassed loads do not increase the cache misses in L2 or L3 cache. This is significant, as a load that bypasses µcache will always access the L2 cache. In order for µcache bypassing to improve performance, the bypassed loads should not increase L2 or L3 cache misses. Part of the explanation to this independence property is the inclusion nature of the cache configuration.

Experiments show that the compiler managed µcache bypassing can significantly reduce the number of misses as well as the miss rates of the µcache. On the average, about 40%, 30%, 24%, and 22% of load references are identified to bypass the 256B, 1K, 4K, and 8K µcaches, respectively. This reduces the numbers of cache misses by 64%, 53%, 45%, and 43%, the µcache miss rates by 39%, 32%, 28%, and 26%, and the total number of load-use stall cycles by 13%, 9%, 6%, and 5%. Meanwhile, the program's schedule length is increased by only 3% in the preliminary implementation, and the L2 and L3 cache misses remain rarely changed.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of compiling a software program to decrease misses of a first cache comprising:
   identifying a load instruction having an expected latency greater than or equal to a threshold;
   requesting that the load instruction be scheduled to have a first latency;
   scheduling the software program;
   comparing an actual latency associated with the load instruction in the scheduled software program to the first latency; and
   if the actual latency is greater than or equal to the first latency, marking the load instruction to bypass the first cache and access a lower level cache.

2. A method as defined in claim 1 wherein requesting that the load instruction be scheduled to have the first latency comprises requesting that the load instruction be scheduled to have the first latency if a bypass probability of the load instruction is greater than or equal to a probability threshold.

3. A method as defined in claim 1 wherein marking the load instruction to bypass the first cache comprises marking the load instruction to bypass the first cache if a bypass probability of the load instruction is greater than or equal to a probability threshold.

4. A method as defined in claim 1 wherein identifying a load instruction having an expected latency greater than or equal to a threshold comprises determining a slack of the load instruction and comparing the determined slack to the threshold.

5. method as defined in claim 1 wherein the first latency is at least one of greater than or equal to a latency time associated with loading data from a second cache.

6. A method as defined in claim 1 wherein comparing the actual latency to the first latency comprises determining a time difference between the load instruction and a use instruction operating upon data loaded by the load instruction and comparing the determined time difference to the first latency.

7. A method as defined in claim 1 wherein marking the load instruction to bypass the first cache comprises setting a flag in the load instruction.

8. A method as defined in claim 1 further comprising:
   identifying a strided load instruction located in a loop;
   determining if the strided load instruction uses more than a first amount of the first cache when the loop is executed; and
   if the strided load instruction uses more than the first amount of the first cache, marking the strided load instruction to bypass the first cache.

9. A method as defined in claim 8 wherein determining if the strided load instruction uses more than the first amount of the first cache when the loop is executed comprises:
   determining a number of trips through the loop in which the strided load instruction is executed;
   multiplying the number of trips with a stride associated with the strided load instruction to develop a stride size value;
   dividing the stride size value by a value representative of a size of the first cache to developed a memory usage percentage; and
   comparing the memory usage percentage to the first amount of the first cache.

10. A method as defined in claim 1 further comprising:
    after marking the load instruction to bypass the first cache, generating object code from the software;
    executing the object code to develop profile data;
    identifying a second load instruction that misses the first cache and wherein a cache line loaded by the second load instruction is not used by another load instruction;
    dividing a number of times the second load instruction misses the first cache without the cache line loaded by the second load instruction being used by another load instruction by a number of times the second load instruction is executed to develop a ratio value; and
    if the ratio value is one of greater than or equal to a first ratio threshold, marking the second load instruction to bypass the first cache.

11. A method as defined in claim 10 further comprising, after marking the second load instruction to bypass the first cache, generating object code from the software.

12. A method of compiling a software program to decrease misses of a first cache comprising:
    prior to scheduling the software, identifying a first set of load instructions for possibly bypassing the first cache;
    requesting scheduling of the software program such that the load instructions in the first set have at least a first latency;
    identifying a second set of load instructions in the scheduled software program having at least the first latency; and
    marking the second set of load instructions to bypass the first cache and access a lower level cache, wherein marking the second set of load instructions to bypass the first cache comprises marking the second set of load instructions to bypass the first cache if a bypass probability of the load instructions is greater than or equal to a probability threshold.

13. A method as defined in claim 12 further comprising:
convening the scheduled software program into object code;
collecting cache profiling data by executing the object code; and
using the cache profiling data to attempt to identify an additional load instruction to mark for bypassing the first cache.

14. A method as defined in claim 12 further comprising:
identifying a strided load instruction; and
marking the strided load instruction to bypass the first cache if the strided load instruction satisfies a first condition.

15. A method as defined in claim 14 wherein the first condition comprises data loaded by the strided load instruction requiring more than a first percentage of the first cache.

16. A method as defined in claim 15 wherein determining if the strided load instruction satisfies the first condition comprises:
determining a number of trips through a loop in which the strided load instruction is executed;
multiplying the number of trips with a stride associated with the strided load instruction to develop a stride size value;
dividing the stride size value by a value representative of a size of the first cache to developed a memory usage percentage; and
comparing the memory usage percentage to the first percentage of the first cache.

17. A method as defined in claim 12 wherein identifying the first set of load instructions for possibly bypassing the first cache comprises identifying load instructions having at least an expected latency.

18. A method as defined in claim 17 wherein identifying the first set of load instructions for possibly bypassing the first cache further comprises identifying load instructions having an execution frequency which is greater than or equal to a frequency threshold.

19. A method as defined in claim 17 wherein identifying load instructions having at least an expected latency comprises determining a slack of a first load instruction and comparing the determined slack to a threshold.

20. A method as defined in claim 12 wherein the first latency is at least one of greater than or equal to a latency time associated with loading data from a second cache.

21. A method as defined in claim 12 wherein identifying the second set of load instructions in the scheduled software program having at least the first latency comprises determining a time difference between a first load instruction and a use instruction operating upon data loaded by the first load instruction and comparing the determined time difference to the first latency.

22. A method as defined in claim 12 wherein marking the second set of load instructions to bypass the first cache comprises setting a flag in each of the load instructions in the second set.

23. A method as defined in claim 12 further comprising:
after marking the second set of load instructions to bypass the first cache, generating object code from the scheduled software program;
executing the object code to develop profile data assuming the second set of instructions bypass the first cache;
identifying a first load instruction that misses the first cache and wherein a cache line loaded by the first load instruction is not reused;
dividing a number of times the first load instruction misses the first cache without the cache line loaded by the first load instruction being used by another load instruction by a number of times the first load instruction is executed to develop a ratio value; and
if the ratio value is one of greater than or equal to a ratio threshold, marking the first load instruction to bypass the first cache.

24. A method as defined in claim 23 further comprising, after marking the first load instruction to bypass the first cache, generating object code from the software.

25. A compiler to reduce misses of a first cache by an executing software program comprising:
a candidate load identifier to identify candidate load instructions for possibly bypassing the first cache;
a scheduler to schedule the software program, wherein the scheduler requests to schedule each of the candidate load instructions to have a latency greater than or equal to a first threshold;
a final load identifier to mark load instructions to bypass the first cache and access a lower level cache;
an object code generator to develop object code from the scheduled software program, the object code incorporating the load instructions marked as bypassing the first cache by the final load identifier; and
a memory cooperating with the object code generator to store the object code.

26. A compiler as defined in claim 25 wherein the candidate load identifier identifies load instructions having an expected latency greater than or equal to a first threshold.

27. A compiler as defined in claim 26 wherein the candidate load identifier determines the expected latency of a first candidate load instruction by determining a slack of the first candidate load instruction.

28. A compiler as defined in claim 26 wherein the first threshold is at least one of greater than or equal to a latency time associated with loading data from a second cache.

29. A compiler as defined in claim 25 wherein the candidate load identifier identifies load instructions having (1) an expected latency greater than or equal to a first threshold and (2) a bypass probability greater than or equal to a second threshold as candidate load instructions.

30. A compiler as defined in claim 29 wherein the candidate load identifier determines the expected latency of a first candidate load instruction by determining a slack of the first candidate load instruction.

31. A compiler as defined in claim 29 wherein the first threshold is at least one of greater than or equal to a latency time associated with loading data from a second cache.

32. A compiler as defined in claim 25 wherein the final load identifier identifies load instructions having (1) an actual latency greater than or equal to a first threshold and (2) a bypass probability greater than or equal to a second threshold as final load instructions.

33. A compiler as defined in claim 32 wherein the final load identifier determines the actual latency of a first load instruction by determining a time difference between the load instruction and a use instruction operating upon data loaded by the first load instruction.

34. A compiler defined in claim 25 wherein the final load identifier marks the load instructions to bypass the first cache by setting a flag in each of the load instructions to be marked.

35. A compiler as defined in claim 25 further comprising a strided load identifier to mark a strided load instruction to bypass the first cache if (1) the strided load instruction is located in a loop; and (2) the strided load instruction uses more than a first amount of the first cache when the loop is executed.

36. A compiler as defined in claim 35 wherein the strided load identifier determines if the strided load instruction uses more than the first amount of the first cache when the loop is executed by: (1) determining a number of trips through the loop in which the strided load instruction is executed; (2) multiplying the number of trips with a stride associated with the strided load instruction to develop a stride size value; (3) dividing the stride size value by a value representative of a size of the first cache to develop a memory usage percentage; and (4) comparing the memory usage percentage to the first amount of the first cache.

37. A compiler as defined in claim 25 further comprising a miss-bypass load identifier to identify a miss-bypass load instruction which misses the first cache and wherein a cache line loaded by the miss-bypass load instruction is not reused.

38. A compiler as defined in claim 37 wherein the miss-bypass load identifier (1) divides (a) a number of times the miss-bypass load instruction misses the first cache without the data loaded by the miss-bypass load instruction being reused by (b) a number of times the miss-bypass load instruction is executed to develop a ratio value; and (2) if the ratio value is one of greater than or equal to a ratio threshold, marks the miss-bypass load instruction to bypass the first cache.

39. A compiler as defined in claim 38 wherein the object code generator generates object code incorporating the marked miss-bypass load instruction.

40. A tangible medium storing machine readable instructions comprising:
first software, which, when executed by a machine, identifies candidate load instructions for possibly bypassing the first cache;
second software, which, when executed by a machine, schedules the software program, wherein the second software request to schedule each of the candidate load instructions to have a latency greater than or equal to a first threshold;
third software, which, when executed by a machine, marks load instructions to bypass the first cache and access a lower cache; and
fourth software, which, when executed by a machine, develops object code from the scheduled software program, the object code incorporating the load instructions marked to bypass the first cache by the third software.

41. A tangible medium as defined in claim 40 wherein the first software identifies load instructions having an expected latency greater than or equal to a first threshold.

42. A tangible medium as defined in claim 41 wherein the first software determines the expected latency of a first candidate load instruction by determining a slack of the first candidate load instruction.

43. A tangible medium as defined in claim 41 wherein the first threshold is at least one of greater than and equal to a latency time associated with loading data from a second cache.

44. A tangible medium as defined in claim 40 wherein the first software identifies load instructions having (1) an expected latency greater than or equal to a first threshold and (2) a bypass probability greater than or equal to a second threshold as candidate load instructions.

45. A tangible medium as defined in claim 44 wherein the first software determines the expected latency of a first candidate load instruction by determining a slack of the first candidate load instruction.

46. A tangible medium as defined in claim 44 wherein the first threshold is at least one of greater than or equal to a latency time associated with loading data from a second cache.

47. A tangible medium as defined in claim 40 wherein the third software identifies load instructions having (1) an actual latency greater than or equal to a first threshold and (2) a bypass probability greater than or equal to a second threshold as final load instructions.

48. A tangible medium as defined in claim 47 wherein the third software determines the actual latency of a first load instruction by determining a time difference between the load instruction and a use instruction operating upon data loaded by the first load instruction.

49. A tangible medium as defined in claim 40 wherein the third software marks the load instructions to bypass the first cache by setting a flag in each of the load instructions.

50. A tangible medium as defined in claim 40 further comprising fifth software to mark a strided load instruction to bypass the first cache if (1) the strided load instruction is located in a loop; and (2) the strided load instruction uses more than a first amount of the first cache when the loop is executed.

51. A tangible medium as defined in claim 50 wherein the fifth software determines if the strided load instruction uses more than the first amount of the first cache when the loop is executed by: (1) determining a number of trips through the loop in which the strided load instruction is executed; (2) multiplying the number of trips with a stride associated with the strided load instruction to develop a stride size value; (3) dividing the stride size value by a value representative of a size of the first cache to developed a memory usage percentage; and (4) comparing the memory usage percentage to the first amount of the first cache.

52. A tangible medium as defined in claim 40 further comprising fifth software to identifying a miss-bypass load instruction which misses the first cache and wherein a cache line loaded by the miss-bypass load instruction is not reused.

53. A tangible medium as defined in claim 52 wherein the fifth software (1) divides (a) a number of times the miss-bypass load instruction misses the first cache without the cache line loaded by the miss-bypass load instruction being reused by (b) a number of times the miss-bypass load instruction is executed to develop a ratio value; and (2) if the ratio value is one of greater than or equal to a ratio threshold, marks the miss-bypass load instruction to bypass the first cache.

54. A tangible medium as defined in claim 53 wherein the fourth software generates object code incorporating the marked miss-bypass load instruction.

* * * * *

UNITED STATES PATENT AND TRADEMARK OFFICE
CERTIFICATE OF CORRECTION

PATENT NO. : 7,467,377 B2
APPLICATION NO. : 10/278682
DATED : December 16, 2008
INVENTOR(S) : Wu et al.

It is certified that error appears in the above-identified patent and that said Letters Patent is hereby corrected as shown below:

Col. 17, line 2: replace "convening" with --converting--.

Col. 18, line 59: replace "defined" with --as defined--.

Col. 20, line 42: replace "identifying" with --identify--.

Signed and Sealed this

Twenty-first Day of April, 2009

JOHN DOLL
*Acting Director of the United States Patent and Trademark Office*